United States Patent
Aijaz

(10) Patent No.: US 11,997,704 B2
(45) Date of Patent: May 28, 2024

(54) SYSTEMS AND METHODS FOR PACKET SCHEDULING FOR INTEGRATED 5G AND MULTI-DOMAIN TSN SYSTEMS

(71) Applicant: Kabushiki Kaisha Toshiba, Tokyo (JP)

(72) Inventor: Adnan Aijaz, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 543 days.

(21) Appl. No.: 17/130,573

(22) Filed: Dec. 22, 2020

(65) Prior Publication Data

US 2022/0201704 A1    Jun. 23, 2022

(51) Int. Cl.
*H04W 72/50* (2023.01)
*H04L 1/00* (2006.01)
(Continued)

(52) U.S. Cl.
CPC ......... *H04W 72/569* (2023.01); *H04L 1/0027* (2013.01); *H04L 47/62* (2013.01);
(Continued)

(58) Field of Classification Search
CPC ...... H04L 1/0027; H04L 47/62; H04W 72/12; H04W 72/1278; H04W 72/50; H04B 17/382
See application file for complete search history.

(56) References Cited

U.S. PATENT DOCUMENTS 10,135,591 B2    11/2018 Chen et al.
2012/0269161 A1*  10/2012 Chin ............... H04B 7/2618
                                                370/335
(Continued)

FOREIGN PATENT DOCUMENTS

WO    WO-2019125396 A1 *  6/2019  ........ H04W 72/0406

OTHER PUBLICATIONS

Cavalcanti, Dave, "Avnu Alliance White Paper: Wireless TSN-Definitions, Use Cases & Standards Roadmap", Mar. 4, 2020, Version 1.0, pp. 1-16 (Year: 2020).*
(Continued)

*Primary Examiner* — Salvador E Rivas
(74) *Attorney, Agent, or Firm* — Oblon, McClelland, Maier & Neustadt, L.L.P.

(57) ABSTRACT

A method of scheduling and transmitting a wireless transmission over an air-interface in a composite network is provided. The composite network comprises a time-sensitive network comprising at least one time-sensitive network entity and a wireless network comprising at least one base station and the air-interface, wherein the air-interface comprises a plurality of slots, wherein each slot has a primary control channel defined at the beginning of the slot, and a number of secondary control channels defined in each slot after the primary control channel, and a plurality of data channels, each primary control channel defining a slot, each secondary channel defining a mini-slot. The method includes if a first air-interface window associated with a first entity in the time-sensitive network arrives at the air-interface before a primary control channel in a first slot of the plurality of slots, scheduling, by the base station via the primary control channel, a frame from the first entity for data transmission over data channels of the air-interface.

12 Claims, 36 Drawing Sheets

(51) Int. Cl.
    *H04L 47/62*        (2022.01)
    *H04W 72/0446*    (2023.01)
    *H04W 72/12*      (2023.01)
    *H04W 72/566*     (2023.01)
    *H04B 17/382*     (2015.01)

(52) U.S. Cl.
    CPC ....... *H04W 72/0446* (2013.01); *H04W 72/12* (2013.01); *H04W 72/50* (2023.01); *H04B 17/382* (2015.01)

(56) References Cited

U.S. PATENT DOCUMENTS

| | | | |
|---|---|---|---|
| 2014/0355540 A1* | 12/2014 | Accongiagioco ... | H04W 72/542 370/329 |
| 2018/0092104 A1 | 3/2018 | Sheng et al. | |
| 2018/0132234 A1 | 5/2018 | Cavalcanti et al. | |
| 2018/0316557 A1* | 11/2018 | Frangieh ................ | H04L 67/34 |
| 2020/0120536 A1* | 4/2020 | Prakash ................ | H04W 72/21 |
| 2021/0204172 A1* | 7/2021 | Rost ................ | H04W 28/0268 |

OTHER PUBLICATIONS

Aljaz et al., "The Tactile Internet for Industries: A Review", Proceedings of the IEEE, vol. 107, No. 2, Feb. 2019, 22 pages.
Aijaz, "Packet Duplication in Dual Connectivity Enabled 5G Wireless Networks: Overview and Challenges", Wireless and Radio Communications, IEEE Communications Standards Magazine, vol. 3, No. 3, Sep. 2019, 9 pages.
U.S. Appl. No. 16/851,257, filed Apr. 17, 2020, Aijaz.
U.S. Appl. No. 16/851,556, filed Apr. 17, 2020, Aijaz.

\* cited by examiner

SYSTEMS AND METHODS FOR PACKET SCHEDULING FOR INTEGRATED 5G AND MULTI-DOMAIN TSN SYSTEMS

FIELD

Embodiments described herein relate generally to a method of scheduling data transfer in communication systems, including integrated 5G and multi-domain TSN systems.

BACKGROUND

Time-sensitive networking (TSN) is a set of standards under development within the IEEE 802.1 working group to improve the real-time capabilities of standard Ethernet. TSN provides guaranteed data delivery with deterministic and bounded latency and extremely low data loss. TSN supports both time-critical and best-effort traffic over a single standard Ethernet network. TSN is expected to be the de-facto wired technology for industrial communication. It is likely to co-exist with high-performance wireless technologies like 5G. Therefore, integration of TSN and 5G is crucial in the envisioned digital transformation of industrial systems. Such integration provides end-to-end deterministic connectivity leading to various design simplifications in industrial automation networks while enabling unprecedented new applications. However, such integration and converged operation of TSN and high-performance wireless also creates various challenges.

In the following, embodiments will be described with reference to the drawings in which.

Figure 22:
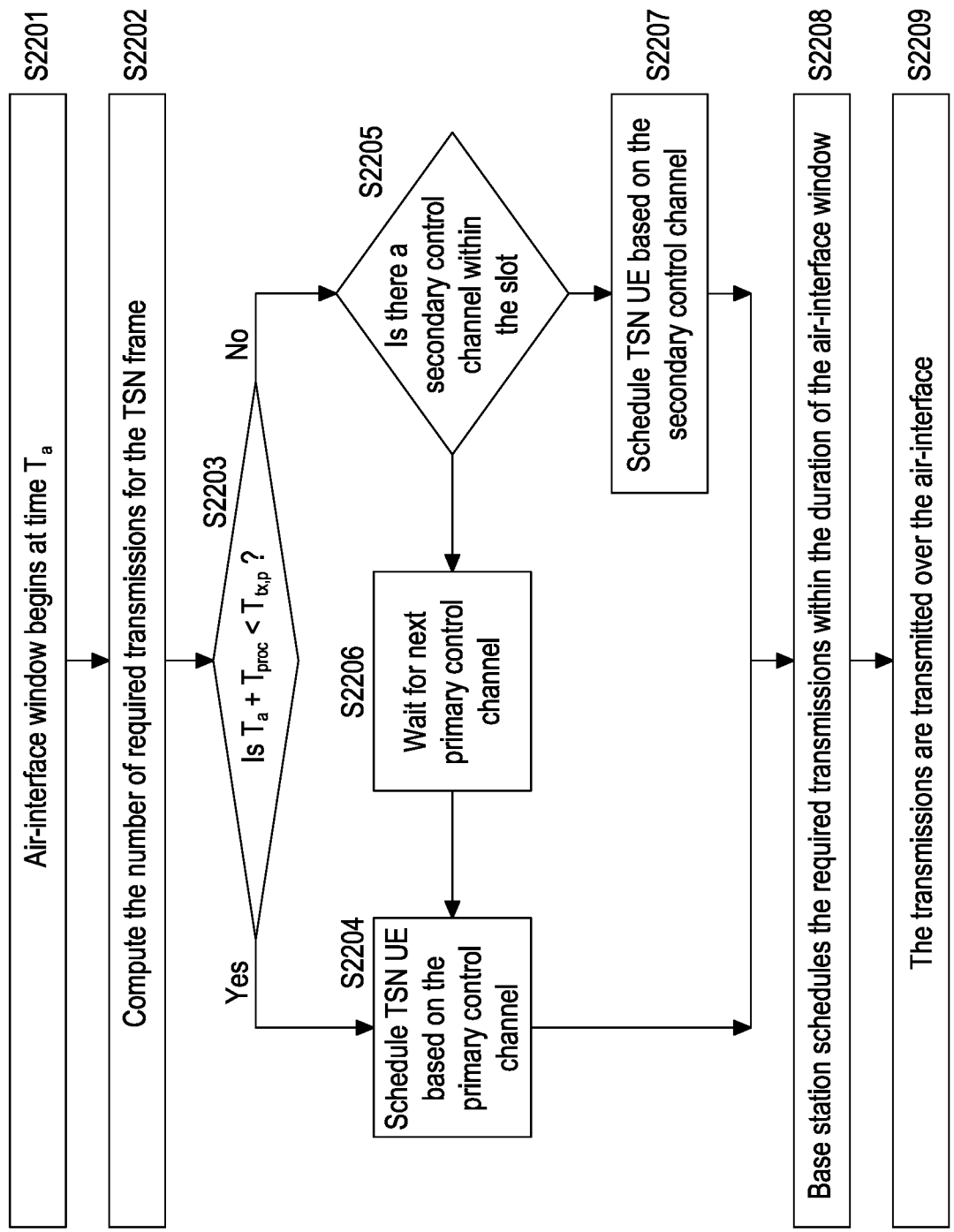
Figure 23:
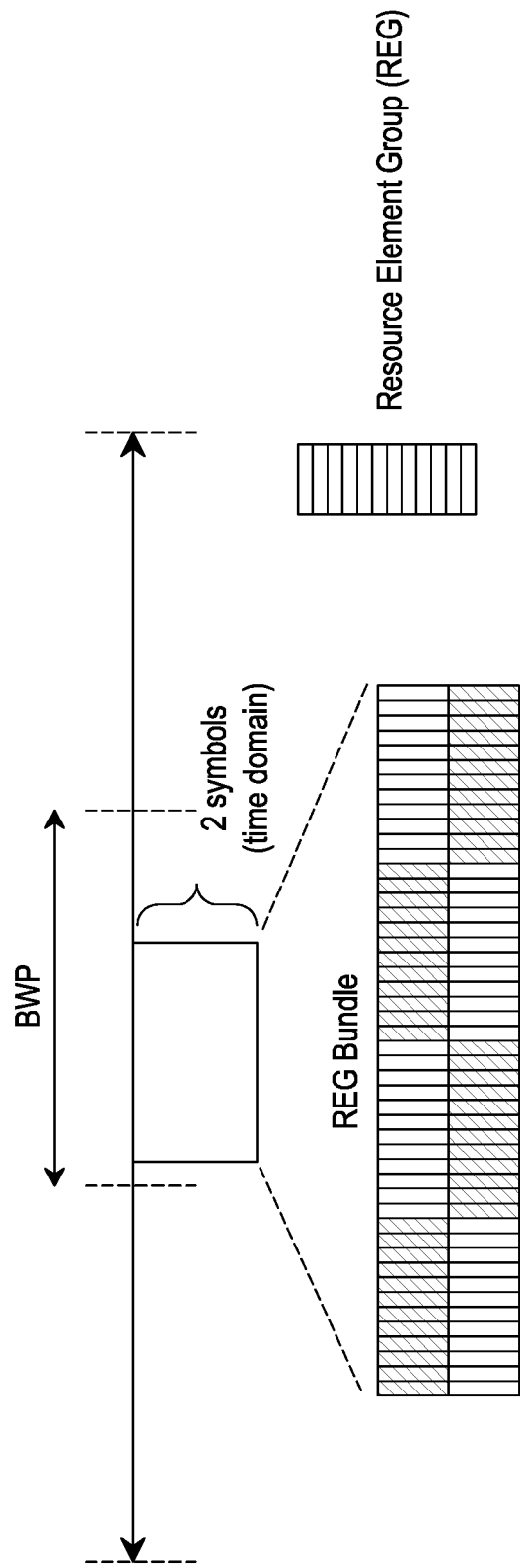
Figure 24:
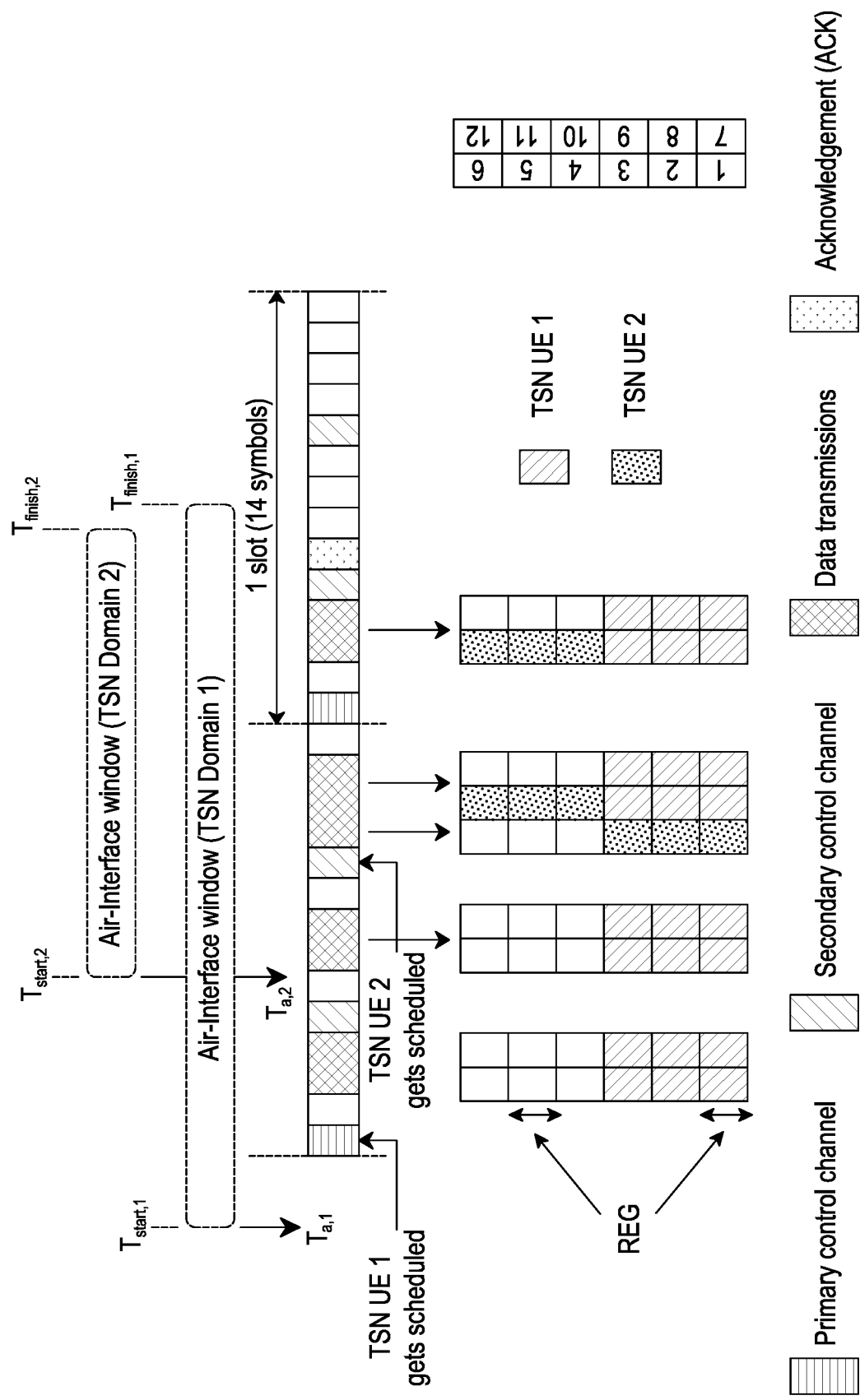
Figure 25:
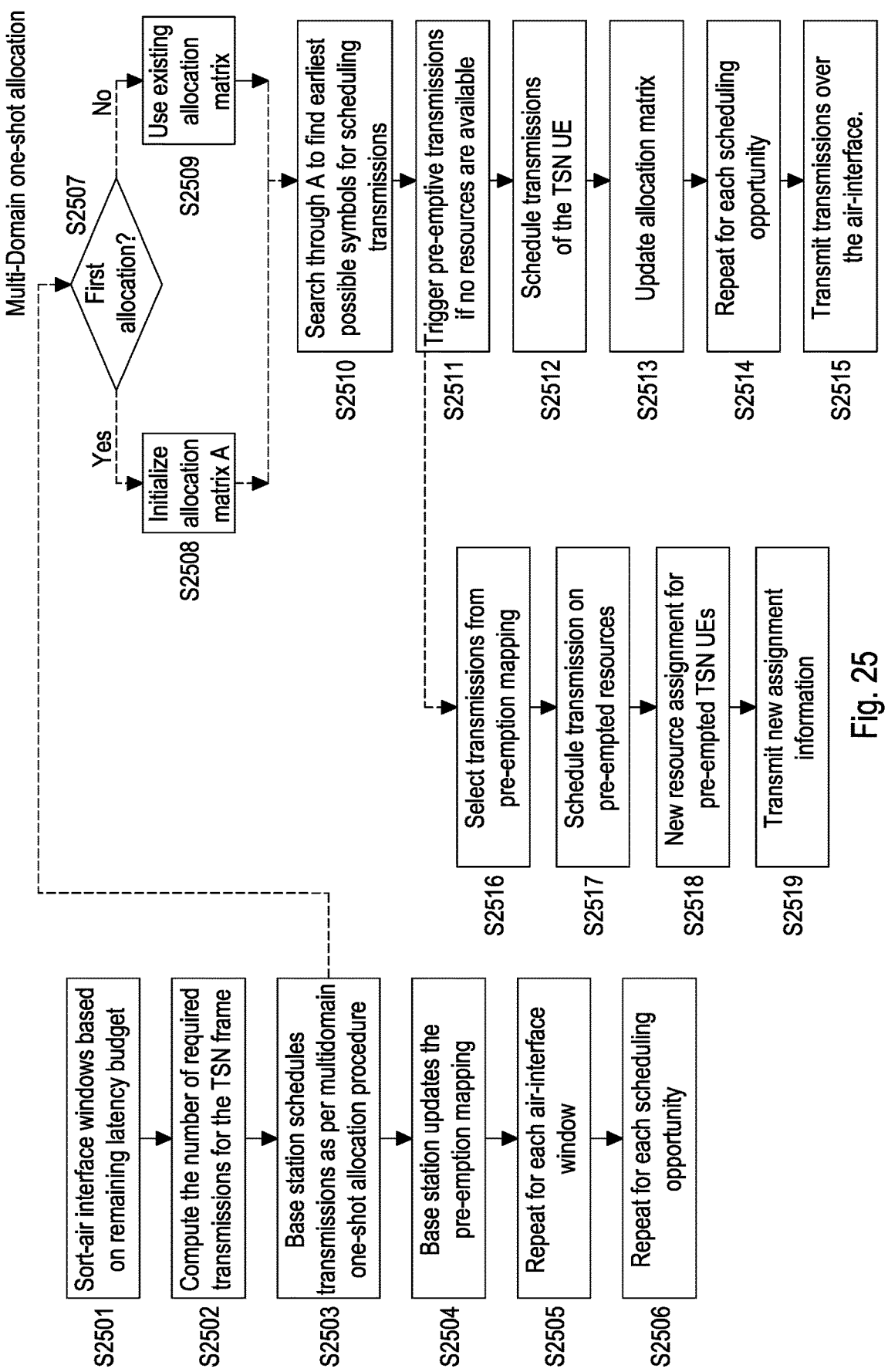
Figure 26:
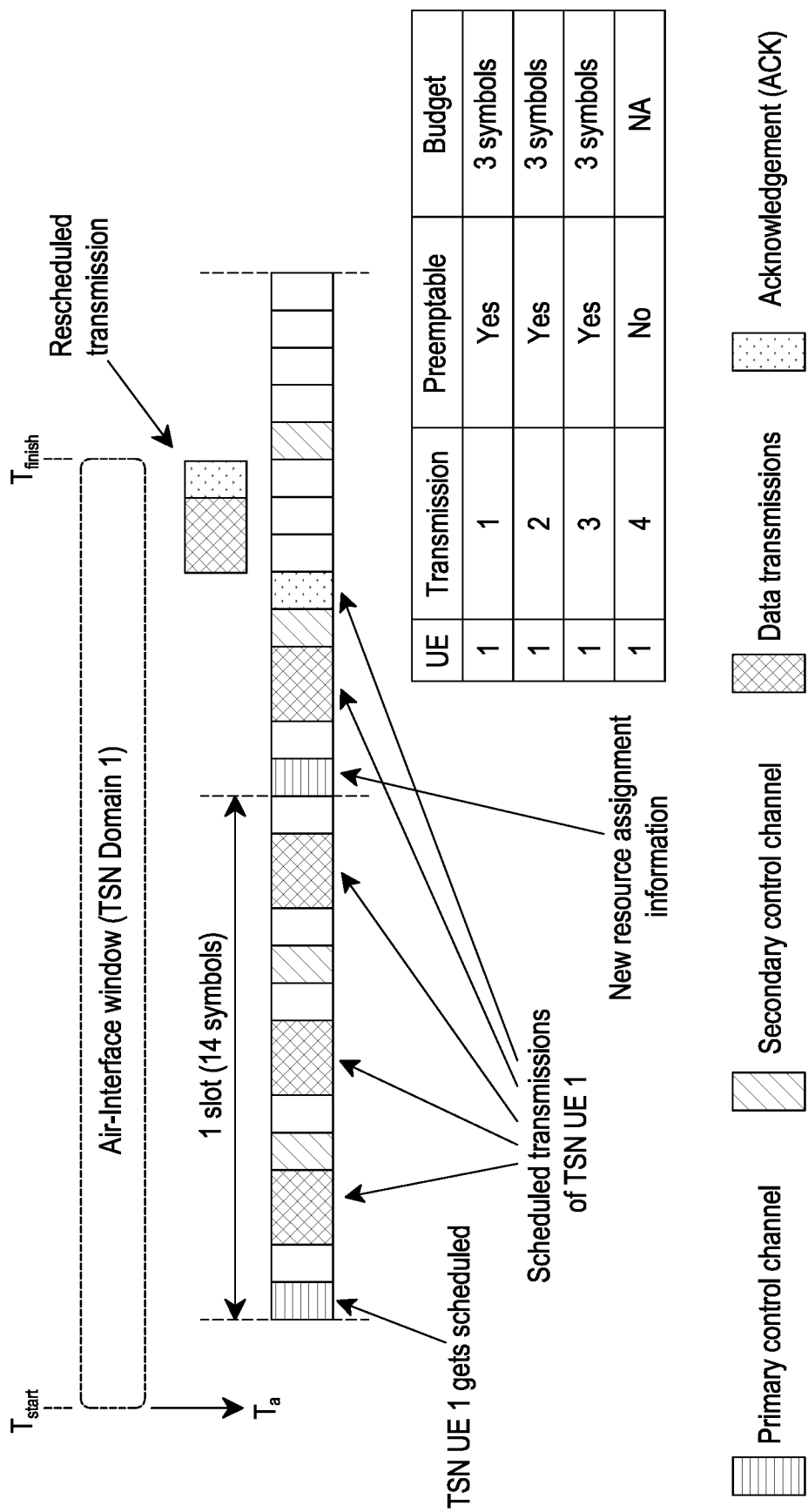
Figure 27:
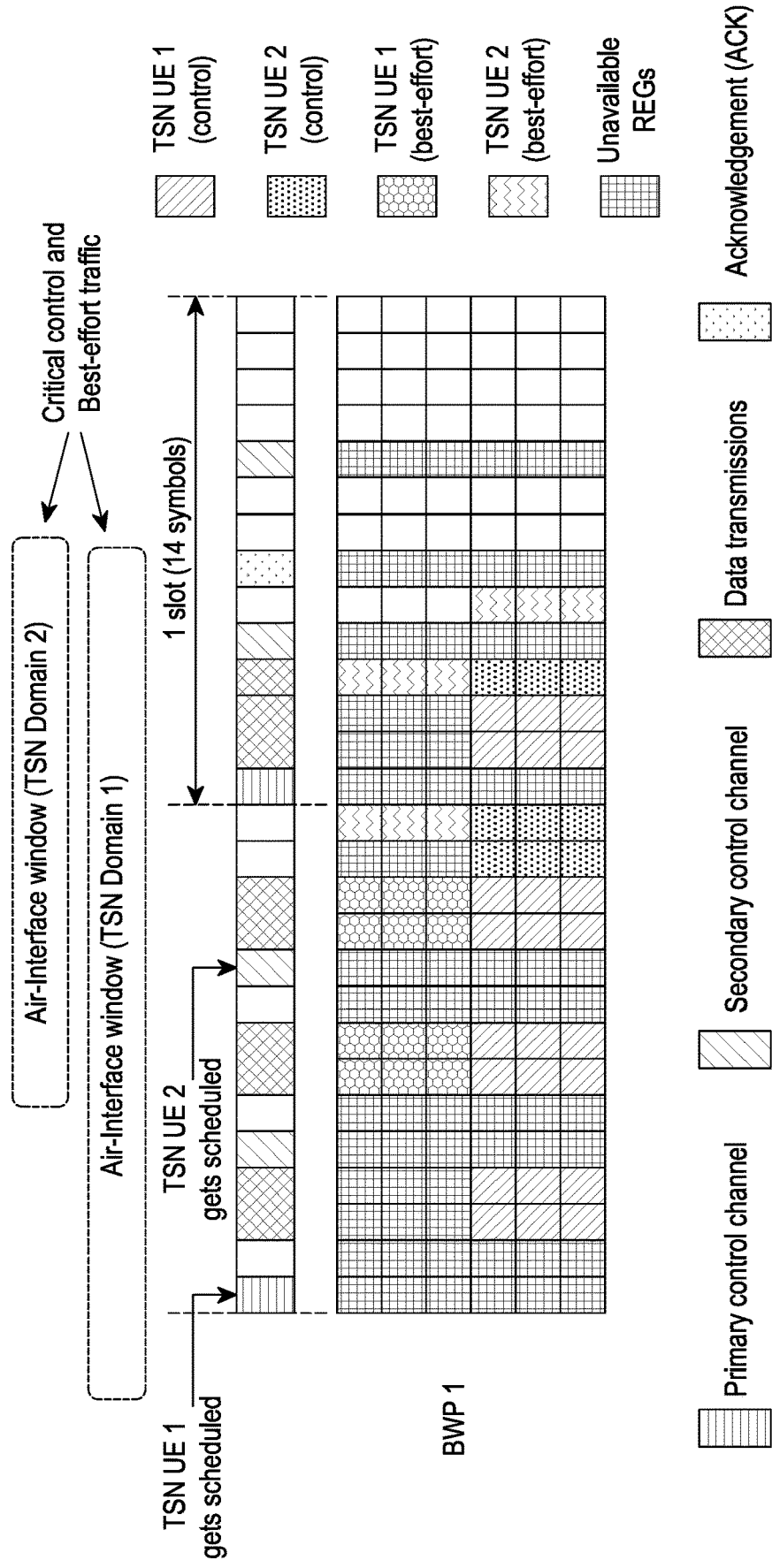
Figure 28:
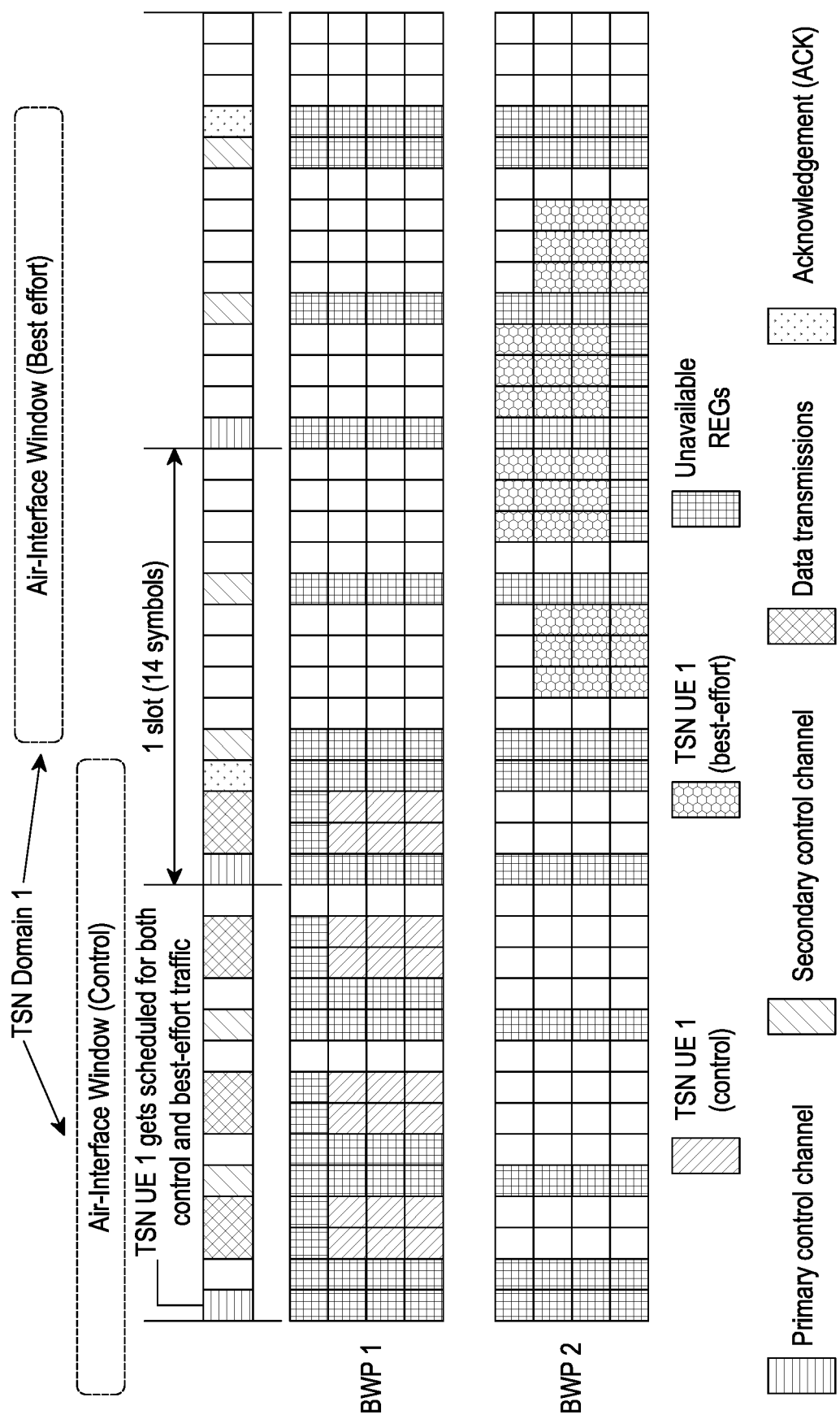

FIG. 22 outlines a method for scheduling of an air-interface window according to an embodiment;

FIG. 23. illustrates the concept of frequency resources in 5G-NR;

FIG. 24 illustrates the multi-domain TSN scheduling scenario according to an embodiment;

FIG. 25 illustrates an optimization method according to an embodiment;

FIG. 26 illustrates an example of pre-emptable transmissions;

FIG. 27 illustrates multi-domain scheduling of critical and best-effort TSN traffic according to an embodiment;

FIG. 28 illustrates multi-domain scheduling of critical and best-effort TSN traffic according to an embodiment.

Figure 29:
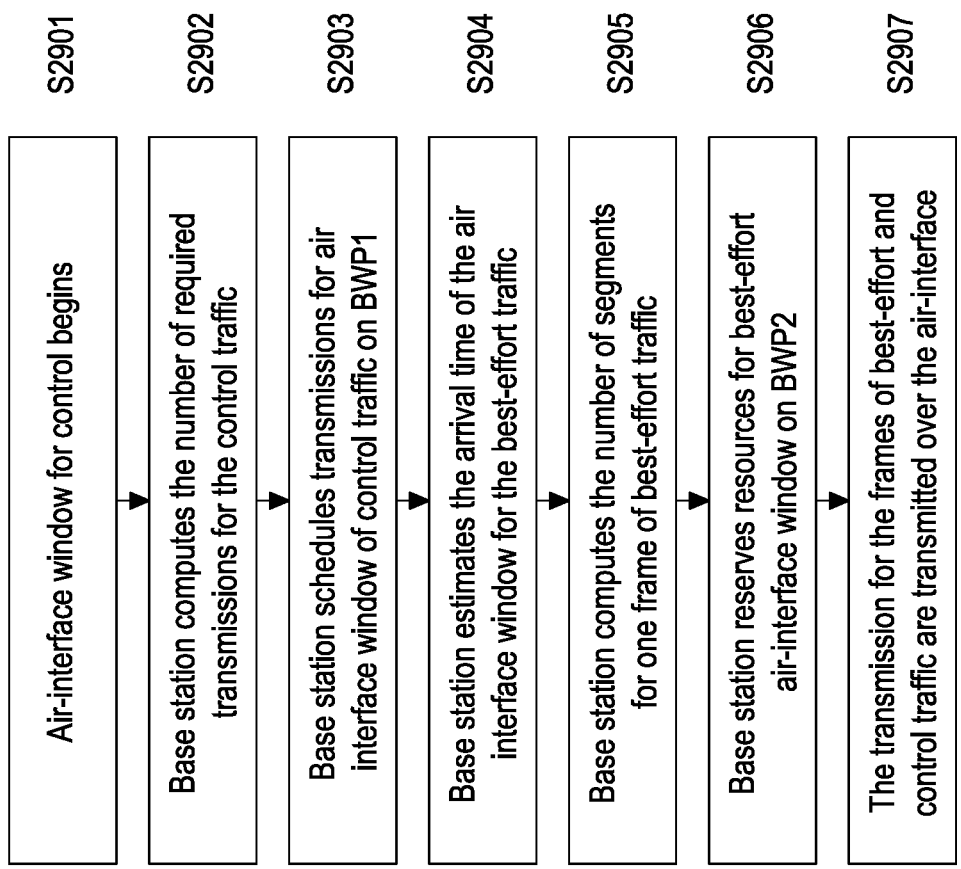
Figure 30:
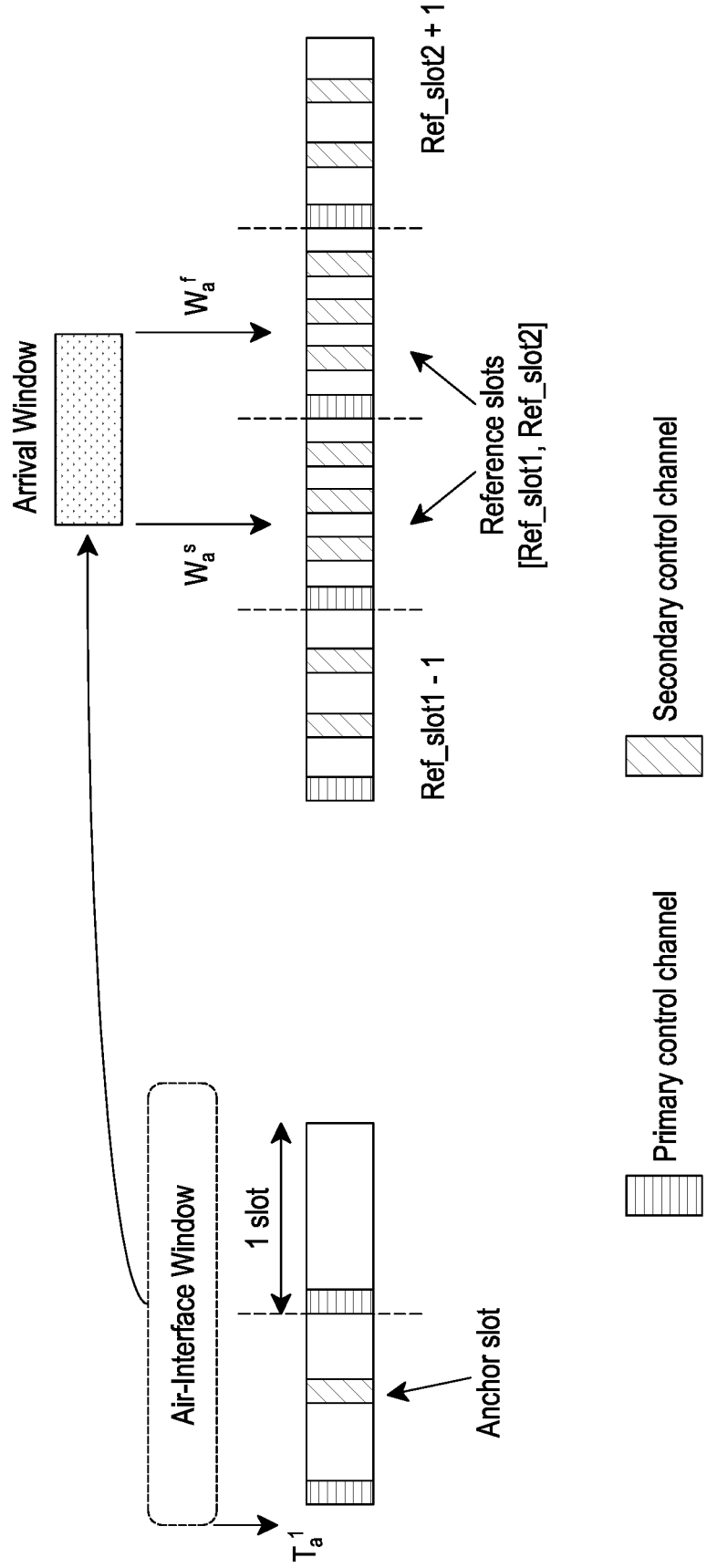
Figure 31:
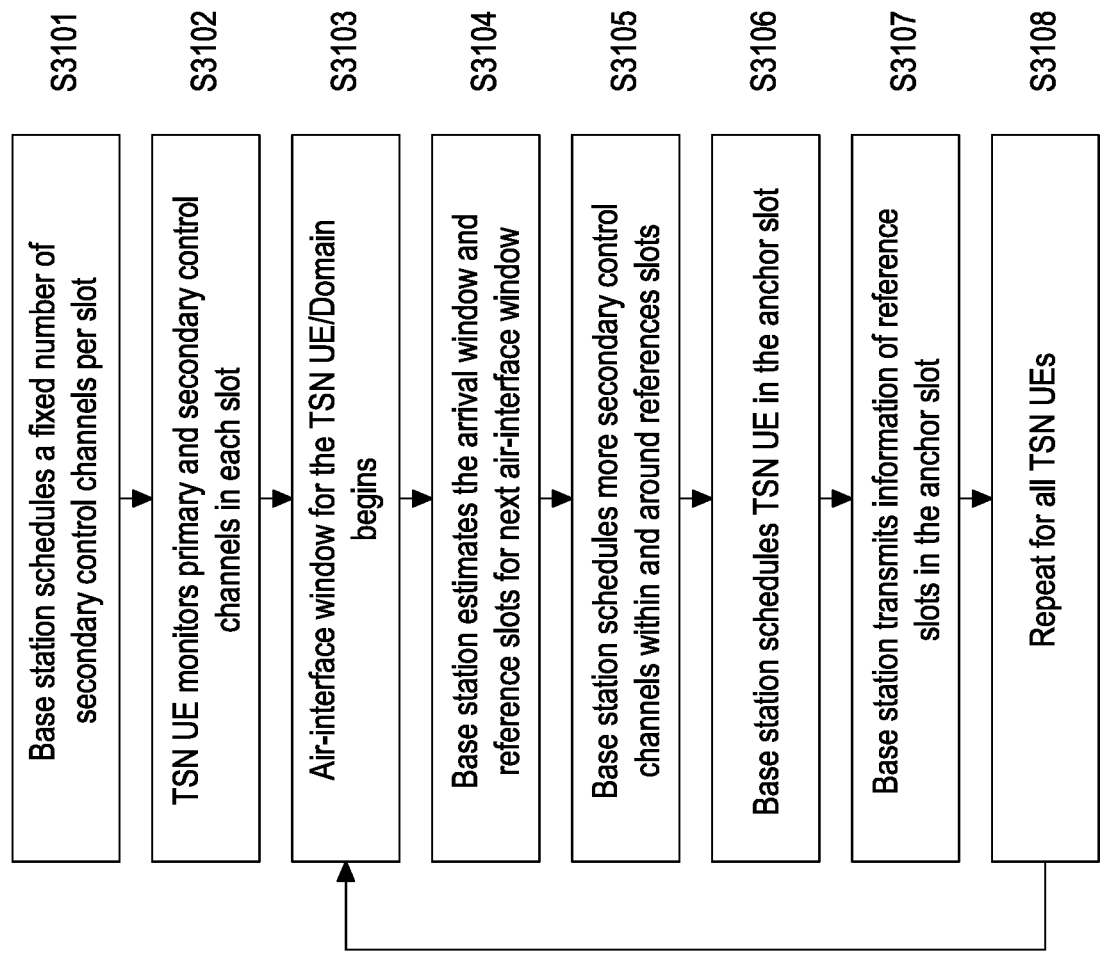
Figure 32:
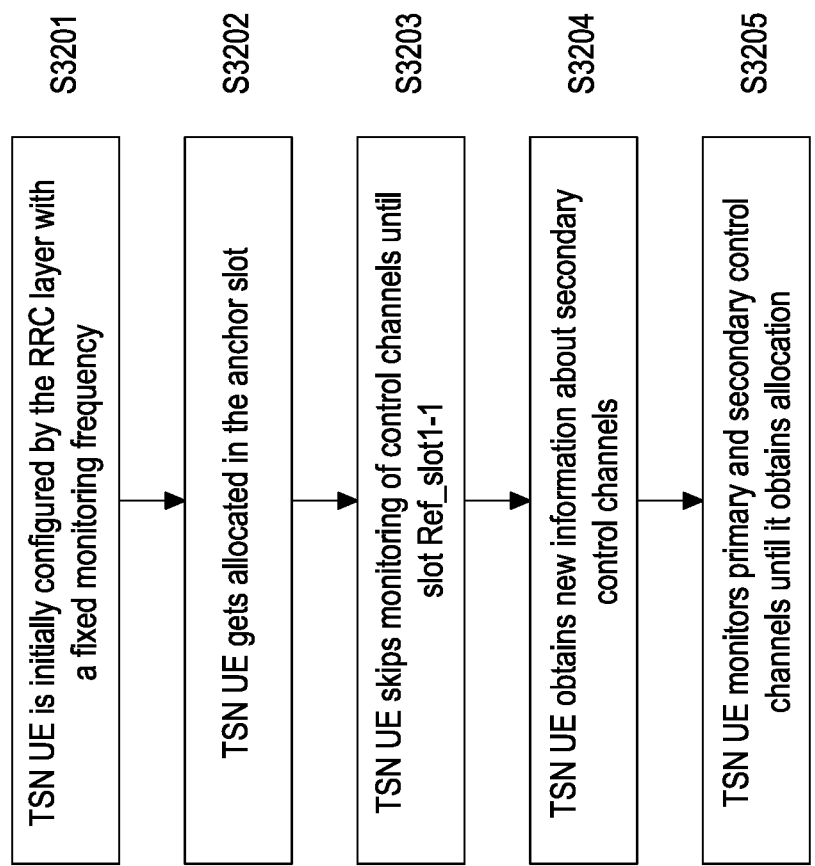
Figure 33:
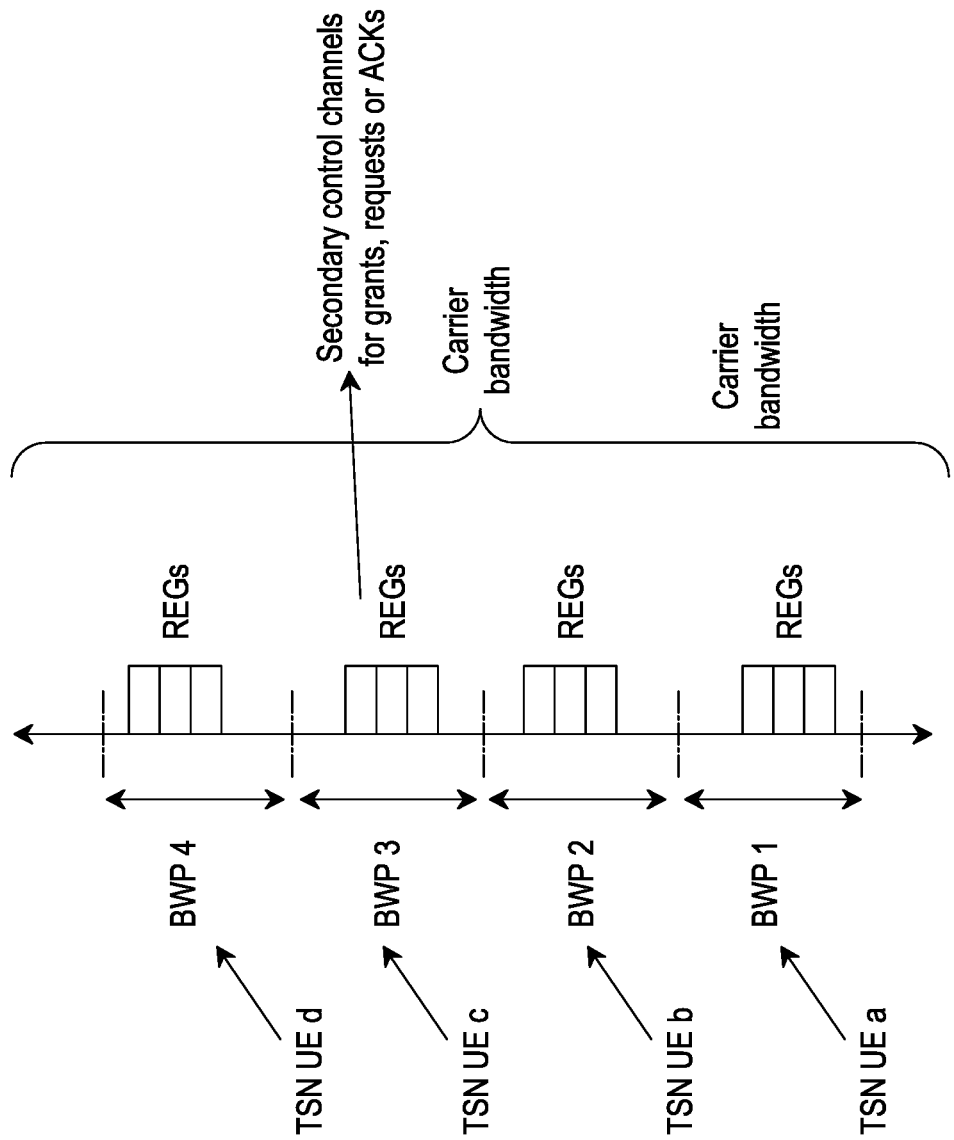
Figure 34:
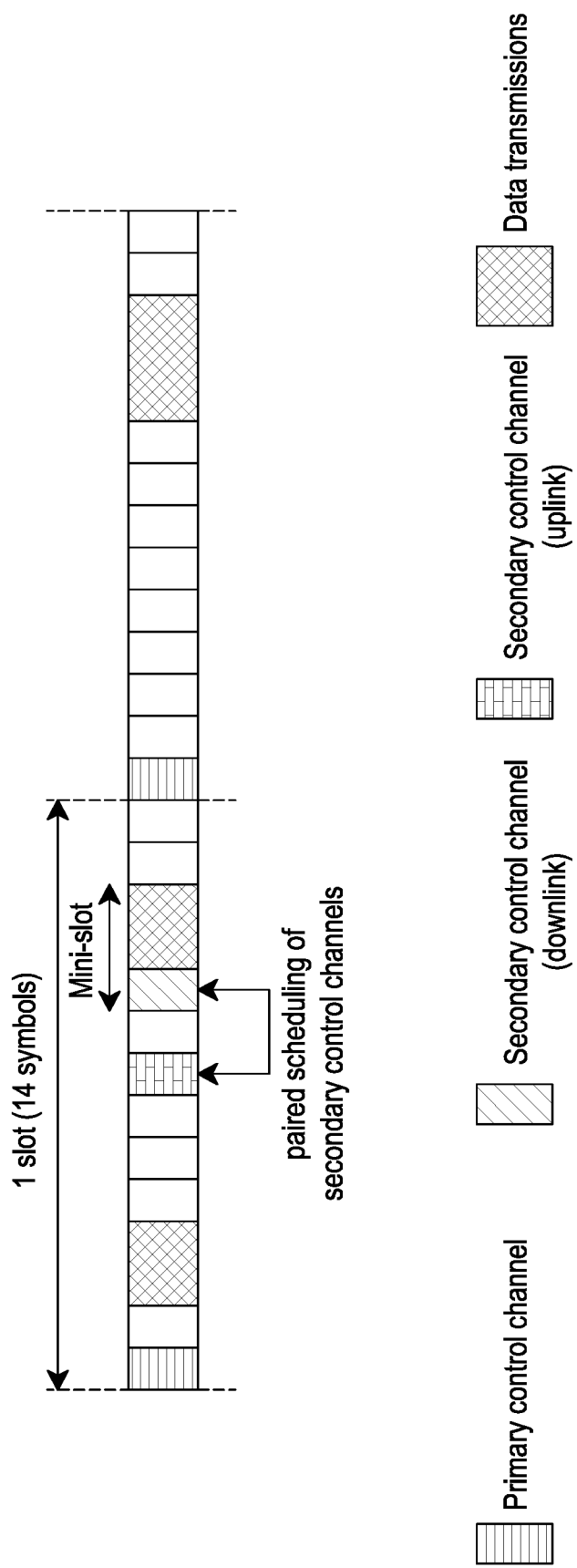
Figure 35:
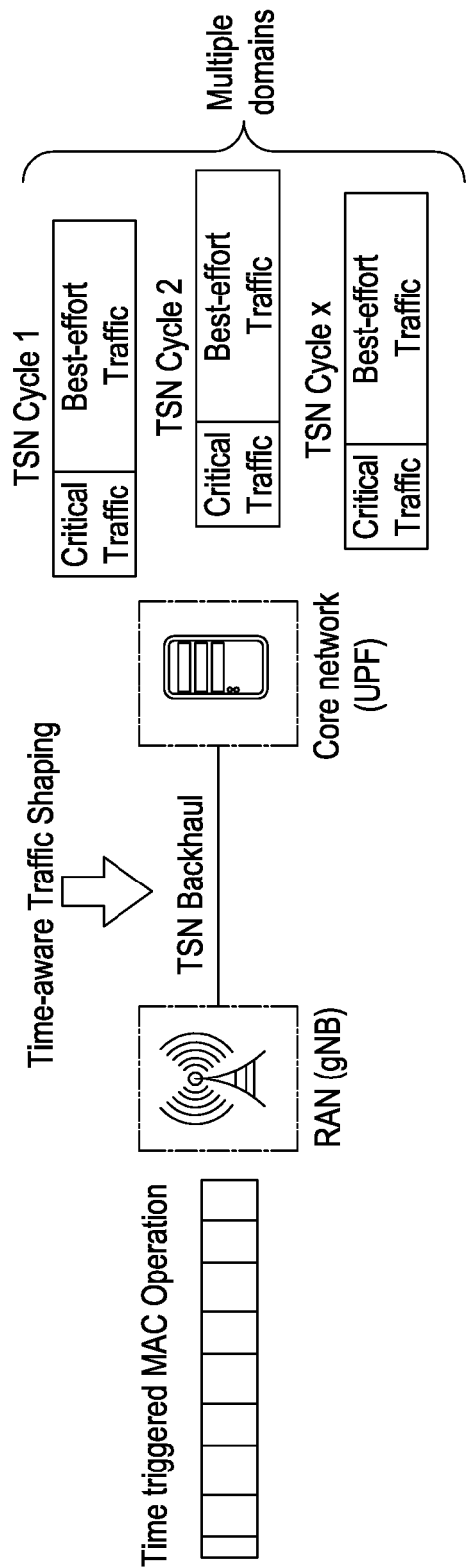
Figure 36:
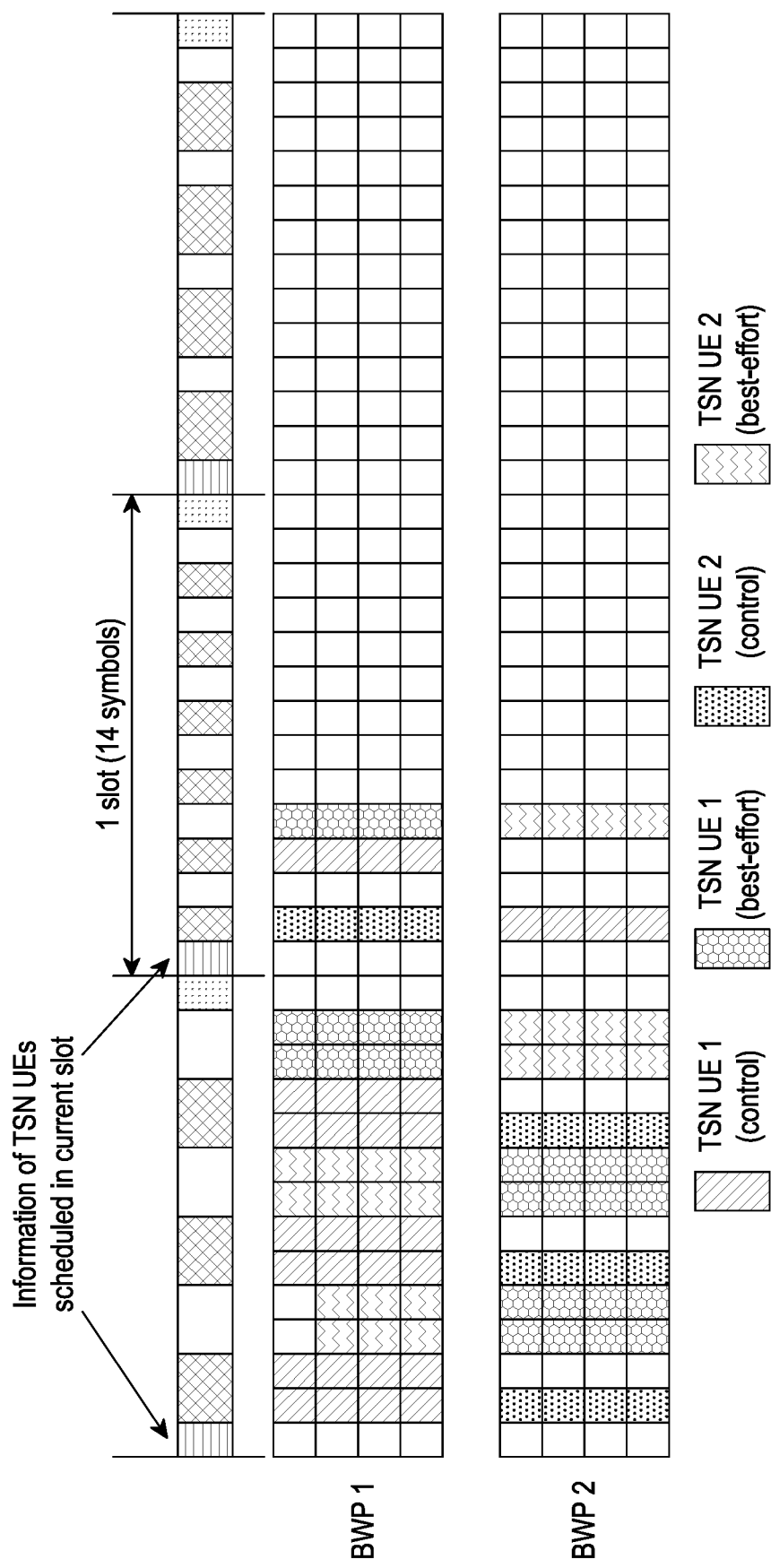

FIG. 29 illustrates an algorithm for proactive scheduling of best-effort traffic;

FIG. 30 illustrates dynamic scheduling of secondary control channels according to an embodiment;

FIG. 31 illustrates a method of dynamic scheduling of secondary control channels according to an embodiment;

FIG. 32 illustrates a method of dynamic scheduling of secondary control channels according to an embodiment;

FIG. 33 illustrates defining secondary control channels for different TSN domains in different BWPs according to an embodiment;

FIG. 34 illustrates paired scheduling of secondary control channels according to an embodiment;

FIG. 35 illustrates time-triggered MAC operation according to an embodiment; and FIG. 36 illustrates time-triggered MAC operation according to an embodiment.

DETAILED DESCRIPTION

According to an embodiment there is provided a method of scheduling and transmitting a wireless transmission over an air-interface in a composite network, wherein the composite network comprises a time-sensitive network comprising at least one time-sensitive network entity and a wireless network comprising at least one base station and the air-interface, wherein the air-interface comprises a plurality of slots, wherein each slot has a primary control channel defined at the beginning of the slot, and a number of secondary control channels defined in each slot after the primary control channel, and a plurality of data channels, each primary control channel defining a slot, each secondary channel defining a mini-slot, the method comprising: if a first air-interface window associated with a first entity in the time-sensitive network arrives at the air-interface before a primary control channel in a first slot of the plurality of slots, scheduling, by the base station via the primary control channel, a frame from the first entity for data transmission over data channels of the air-interface; and if the first air-interface window associated with the first entity in the time-sensitive network arrives at the air-interface after the primary control channel in the first slot but before a secondary control channel in the first slot, scheduling, by the base station via the secondary control channel, the frame from the first entity for data transmission over data channels of the air-interface. The primary control channel is always at the beginning of a sub-frame and it always contains information about secondary control channels in a sub-frame.

In an embodiment each data channel comprises at least one OFDM symbol in the time domain.

In an embodiment, the method further comprises transmitting the frame over the data channels of the air-interface.

In an embodiment, the frame from the first entity comprises a plurality of transmissions, wherein each transmission is scheduled over a corresponding data channel in the air-interface.

In an embodiment, each data channel comprises at least one symbol in the time domain and a number of resource elements in the frequency domain, the method further comprising: scheduling, by the base station, the frame from the first entity for transmission over data channels of the air-interface using an allocation matrix, wherein the allocation matrix indicates availability of the resource elements of the air-interface.

In an embodiment, the first dimension of the allocation matrix is the symbols in time domain, the second dimension of the matrix is the REGs in frequency domain and the third dimension of the matrix is the available BWPs.

In an embodiment, the frame from the first entity is scheduled for transmission on a first set of resource elements, the method further comprising: scheduling, by the base station, a frame from a second entity associated with a second air-interface window for transmission over data channels of the air-interface using the allocation matrix, wherein the frame from the second entity is scheduled on a second set of resource elements. Optionally, the method further comprises determining, by the base station, using the allocation matrix, earliest available resource elements for allocation to the first air-interface window associated with the first entity. This provides additional margin for retransmission if a transmission is pre-empted.

In an embodiment, each data channel comprises one symbol in the time domain and a number of resource elements in the frequency domain and the method further comprises scheduling, by the base station, the frame from the first entity for data transmission over data channels of the air-interface using a pre-emption mapping, wherein the pre-emption mapping indicates scheduled transmissions that can be pre-empted. Optionally, the method further comprising determining, by the base station using the pre-emption mapping, an earliest available resource element for allocation to the first air-interface window associated with the first entity.

In an embodiment, the method further comprises, if the frame from the first entity comprises a critical control, and there are no available data channels for transmission of the frame, overwriting, by the base station, scheduled transmissions for a third entity; and rescheduling, by the base station, the overwritten scheduled transmissions for the third entity in a primary control channel of a second slot.

In an embodiment, the number and location of the secondary control channels is selected dynamically. Secondary control channels are dynamically scheduled for resource allocation of next air-interface of a TSN domain following initial resource allocation.

In an embodiment, the method further comprises estimating, by the base station, an arrival window of a second air-interface window associated with the first entity, wherein the arrival window is associated with at least one reference slot; and scheduling, by the base station, additional secondary control channels within the at least one reference slot, within a slot immediately preceding the at least one reference slot and within a slot immediately following the at least one reference slot. Optionally, the method further comprises sending, by the base station, information regarding the at least one reference slot to the first entity in the first air-interface window, and/or waiting, by the first entity, to monitor the secondary control channels until the slot preceding the at least one reference slot; and receiving, by the first entity, resource allocation information in a primary control channel in the slot immediately preceding the at least one reference slot.

In an embodiment, secondary control channels for the first entity are defined in a first bandwidth part (BWP) and secondary control channels for a fourth entity are defined in a second BWP (bandwidth part). Defining control channels within specific BWPs reduces monitoring overheads on the TSN UE side which leads to improvement in energy efficiency In an embodiment the frame comprises a critical frame and a best-effort frame, wherein the critical frame and the best-effort frame need to be transmitted during the first air-interface window.

In an embodiment the first air-interface window associated with the first entity consists of a critical frame or frames, wherein a second air-interface window associated with the first entity consists of best-effort frames, the method further comprising: allocating, by the base station, resource elements in a first bandwidth part (BWP) to the first air-interface window and resource elements in a second bandwidth part (BWP) to the second air-interface window. Optionally, the method further comprises estimating, by the base station, an interval during which the best-effort window is expected to arrive at the air-interface; reserving, by the base station resource elements for the best-effort traffic on the second bandwidth part (BWP).

In an embodiment the base station is connected to a core network of the wireless network via a backhaul guided network, and the method further comprises sending, by the backhaul guided network, the data from the plurality of time-sensitive networks to the base station at fixed intervals; and scheduling, by the base station, control and best-effort frames in uniformly distributed data-channels of the air-interface.

In an embodiment, each secondary control channel defining a mini slot is preceded by a secondary control channel not defining a mini slot, wherein the secondary control channel not defining a mini slot is for uplink data, and the secondary control channel defining a mini slot is for downlink data.

According to an embodiment there is provided a system for scheduling and transmitting a wireless transmission over an air-interface comprising: a time-sensitive network comprising at least one time-sensitive network entity; and a wireless network comprising at least one base station and the air-interface, wherein the air-interface comprises a plurality of slots, wherein each slot has a primary control channel defined at the beginning of the slot, and a number of secondary control channels defined in each slot after the primary control channel, and a plurality of data channels, each primary control channel defining a slot, each secondary channel defining a mini-slot, the system configured to: if an first air-interface window associated with a first entity in the time-sensitive network arrives at the air-interface before a primary control channel in a first slot of the plurality of slots, scheduling, by the base station via the primary control channel, a frame from the first entity for data transmission over data channels of the air-interface; and if the first air-interface window associated with the first entity in the time-sensitive network arrives at the air-interface after the primary control channel in the first slot but before a secondary control channel in the first slot, scheduling, by the base station via the secondary control channel, the frame from the first entity for data transmission over data channels of the air-interface.

In an embodiment the system is further configured to transmit the frame over the data channels of the air-interface.

According to an embodiment there is provided a method of operating a base station of a wireless network, wherein the wireless network is configured to transmit data from a plurality of external time-sensitive networks, wherein the base station is connected to a core network of the wireless network via a backhaul guided network, the method comprising sending, by the backhaul guided network, the data from the plurality of external time-sensitive networks to the base station at fixed intervals; and scheduling, by the base station, control and best-effort frames in uniformly distributed data-channels of an air-interface of the wireless network.

According to an embodiment there is provided a wireless system comprising a backhaul guided network between a base station and a core network, the wireless network is configured to transmit data from a plurality of external time-sensitive networks, the backhaul guided network configured to send the data from the plurality of external time-sensitive networks to the base station at fixed intervals; the system configured to schedule, by the base station, control and best-effort frames in uniformly distributed data-channels of an air-interface of the wireless network.

In the figures and examples following, the term 5G is not limited to 5G cellular networks, and may refer to other 5g technologies such as 5G Wi-Fi.

Figure 1:
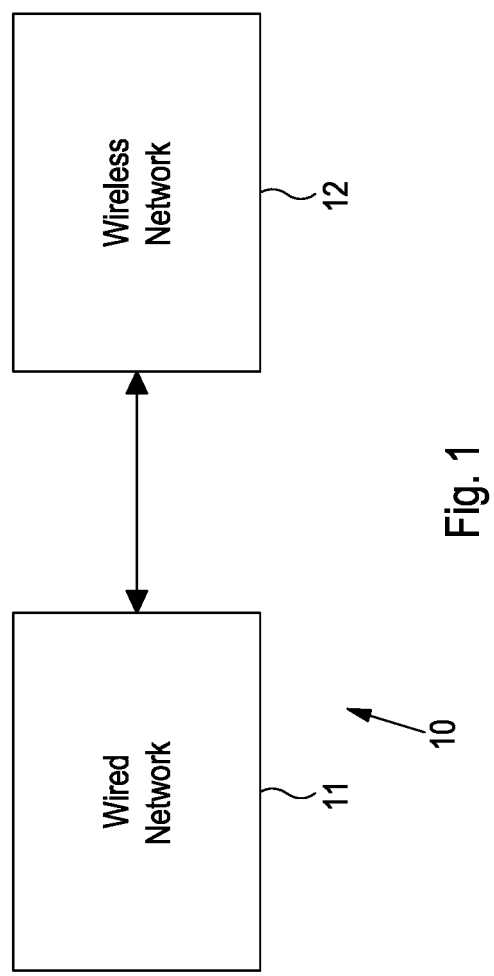
FIG. 1 illustrates schematically a network arrangement of a wireless network and a time-sensitive network, in accordance with embodiments of the present disclosure.

FIG. 1 shows, in general schematic form, a composite, or hybrid, network arrangement 10 comprising a wired (or guided) network 11 and a wireless network 12.

Figure 2:
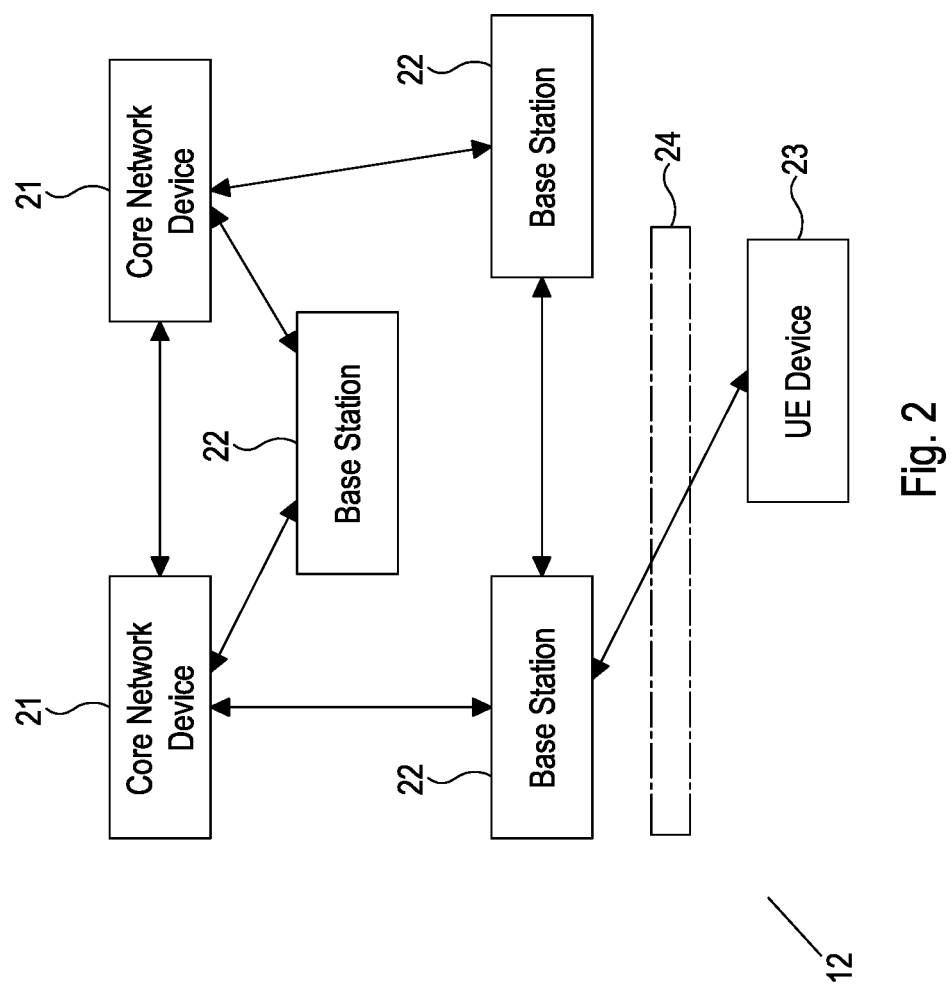
FIG. 2 illustrates the architecture of the wireless network of FIG. 1.

FIG. 2 shows the architecture of the wireless network of FIG. 1, implemented as a 5G New Radio (NR) network. The wireless network comprises a plurality of core network components 21 connected with a plurality of base stations 22. The base stations 22 in a 5G network are referred to as next-generation Node B or gNB. Each base station 22 can establish wireless communication with one or more User Equipment (UE) devices (23). The air interface (24) is the radio-frequency portion between the UE device 23 and the active base station 22.

Figure 3:
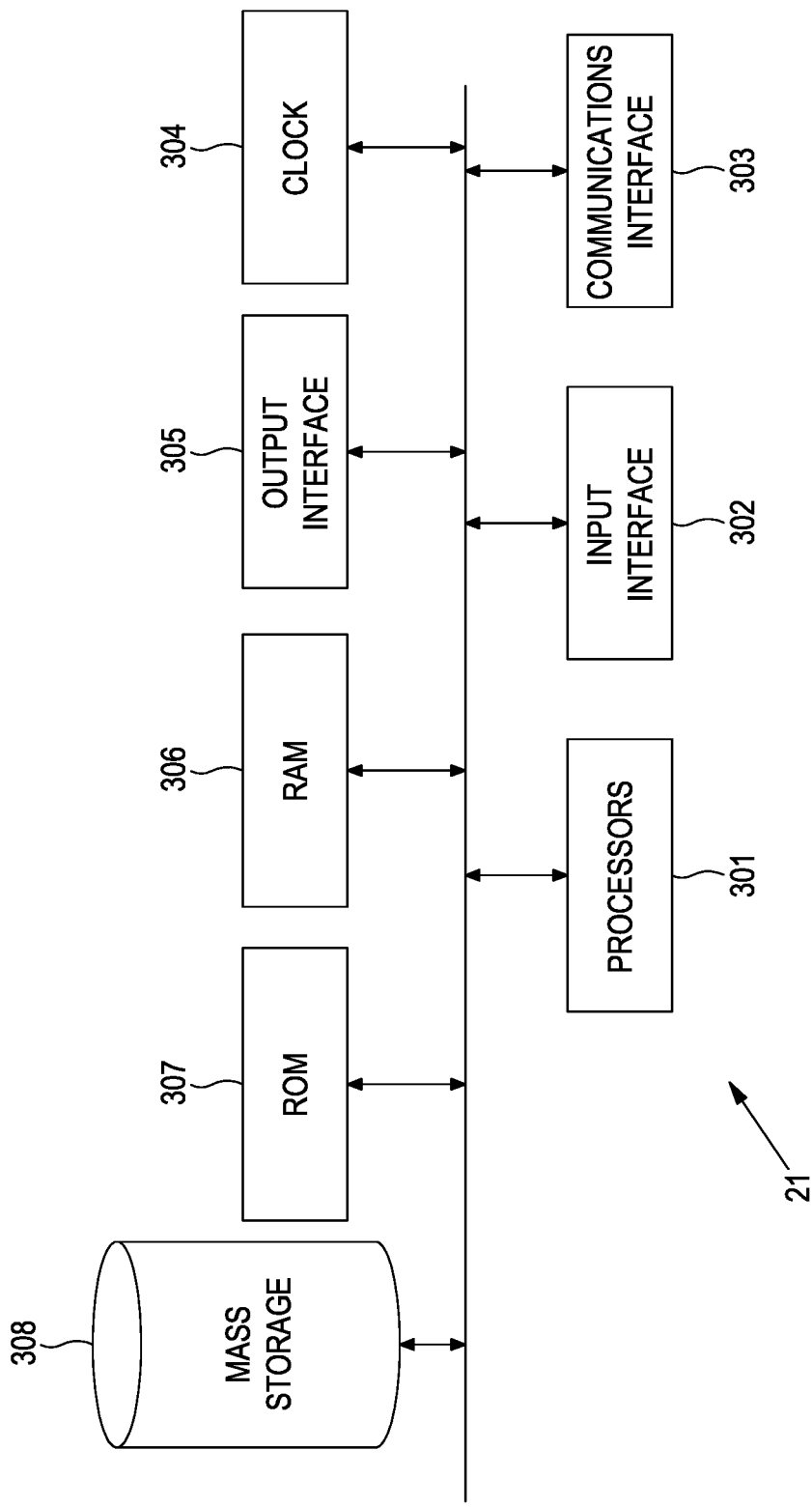
FIG. 3 illustrates the architecture of a core network component of the wireless network of FIG. 2.

FIG. 3 illustrates the architecture of a core network component 21. As shown in FIG. 3, the core network component 21 is a computer apparatus, in structure and function. It may share certain features with general purpose computer apparatus, but some features may be implementation specific, given the specialised function for which the network component 21 is to be put. The reader will understand which features can be of general-purpose type, and which may be required to be configured specifically for use in the current context.

The apparatus 21 thus comprises one or more processors 301, either generally provisioned, or configured for other purposes such as mathematical operations, audio processing, managing a communications channel, and so on.

An input interface 302 provides a facility for receipt of user input actions. Such user input actions could, for instance, be caused by user interaction with a specific input unit including one or more control buttons and/or switches, a touchscreen, a keyboard, a mouse or other pointing device, a speech recognition unit enabled to receive and process speech into control commands, a signal processor configured to receive and control processes from another device such as a tablet or smartphone, or a remote-control receiver. This list will be appreciated to be non-exhaustive and other forms of input, whether user initiated or automated, could be envisaged by the reader.

Likewise, an output interface 305 is operable to provide a facility for output of signals to a user or another device. Such output could include a display signal for driving a local video display unit (VDU) or any other device.

A communications interface 303 implements a communications channel, whether broadcast or end-to-end, with one or more recipients of signals. In the context of the present embodiment, the communications interface is configured to cause emission of signals for communication with base stations 22 or other core network components 21.

The processors 301 are operable to execute computer programs, in operation of the component 21. In doing this, recourse is made to data storage facilities provided by a mass storage device 38 which is implemented to provide large-scale data storage albeit on a relatively slow access basis, and will store, in practice, computer programs and, in the current context, communication data, in preparation for execution of an encoding process prior to the placement of encoded data on a transmitted signal.

A Read Only Memory (ROM) 307 is preconfigured with executable programs designed to provide the core of the functionality of the component 21, and a Random Access Memory 306 is provided for rapid access and storage of data and program instructions in the pursuit of execution of a computer program. Each of these is configured to implement a communications protocol adopted by plural interoperable devices.

A clock 304 provides a timing signal for all other components of the device. The clock signal can be adjusted if required, for synchronization with other devices.

Figure 4:
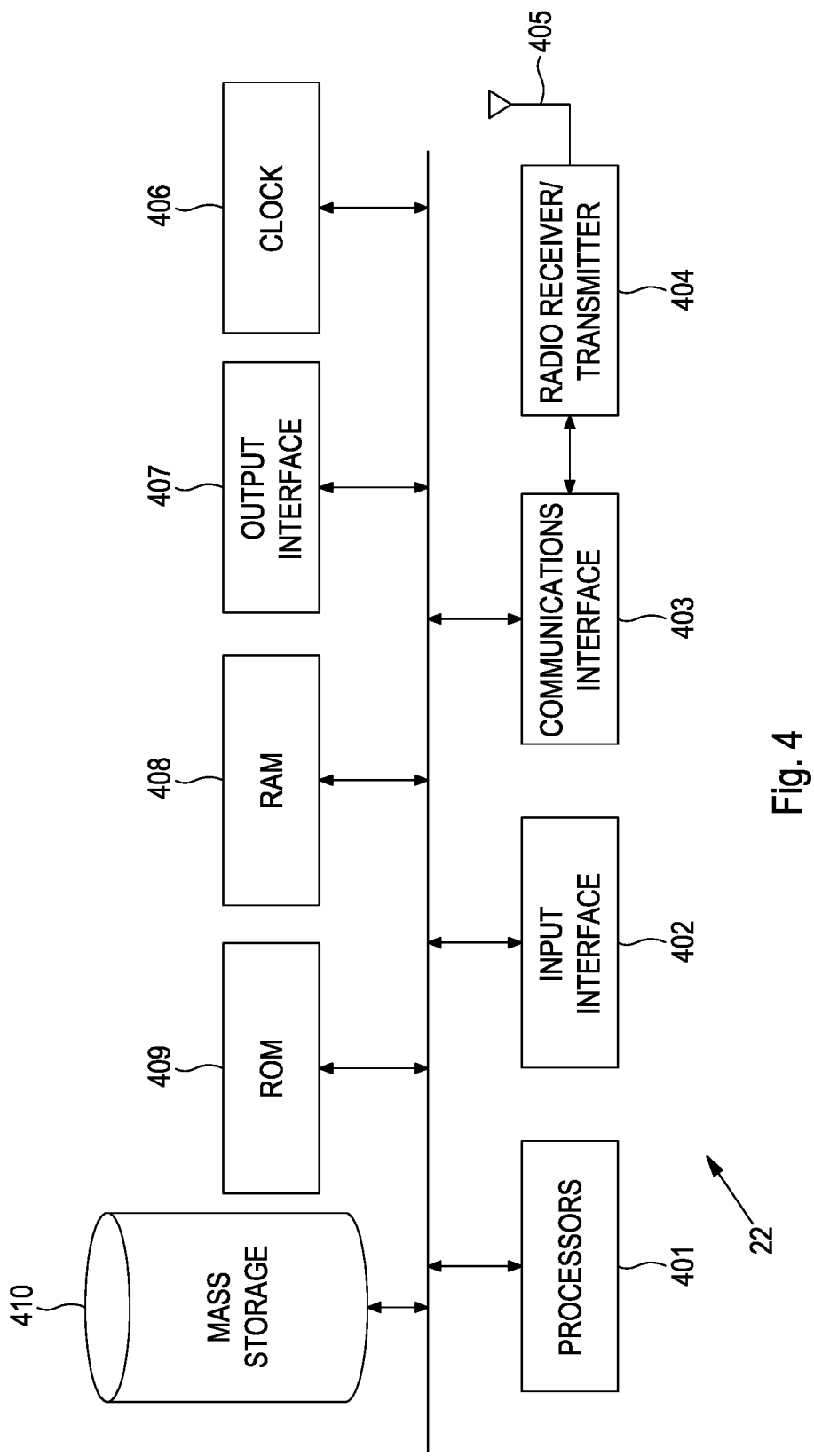
FIG. 4 illustrates the architecture of a base station of the wireless network of FIG. 2.

FIG. 4 illustrates the architecture of a base station 22. As shown in FIG. 4, the base station 22 is a computer apparatus, in structure and function. It may share certain features with general purpose computer apparatus, but some features may be implementation specific, given the specialised function for which the base station is to be put. The reader will understand which features can be of general-purpose type, and which may be required to be configured specifically for use in a wireless communications transmitter.

The base station 22 thus comprises one or more processors 401, either generally provisioned, or configured for other purposes such as mathematical operations, audio processing, managing a communications channel, and so on.

An input interface 402 provides a facility for receipt of user input actions. Such user input actions could, for instance, be caused by user interaction with a specific input unit including one or more control buttons and/or switches, a touchscreen, a keyboard, a mouse or other pointing device, a speech recognition unit enabled to receive and process speech into control commands, a signal processor configured to receive and control processes from another device such as a tablet or smartphone, or a remote-control receiver. This list will be appreciated to be non-exhaustive and other forms of input, whether user initiated or automated, could be envisaged by the reader. It will be appreciated that such user input actions would not normally be required in general operation, but may be required in installation or maintenance of the equipment.

Likewise, an output interface 406 is operable to provide a facility for output of signals to a user or another device. Such output could include a display signal for driving a local video display unit (VDU) or any other device.

A communications interface 403 implements a communications channel, whether broadcast or end-to-end, with one or more recipients of signals. In the context of the present embodiment, the communications interface is configured to cause emission of a signal encoded by the base station. The communications controller 403 is in communication with a receive/transmit unit 404 which is operable to translate signals between the domain used by the controller and the radio signal domain used for wireless communication, the radio signal domain signals being transmitted and received at an antenna 405.

The processors 401 are operable to execute computer programs, in operation of the base station 22. In doing this, recourse is made to data storage facilities provided by a mass storage device 410 which is implemented to provide large-scale data storage albeit on a relatively slow access basis, and will store, in practice, computer programs and, in the current context, communication data, in preparation for execution of an encoding process prior to the placement of encoded data on a transmitted signal.

A Read Only Memory (ROM) 409 is preconfigured with executable programs designed to provide the core of the functionality of the base station 22, and a Random Access Memory 408 is provided for rapid access and storage of data and program instructions in the pursuit of execution of a computer program. Each of these is configured to implement a communications protocol adopted by plural interoperable devices.

A clock 406 provides a timing signal for all other components of the device. The clock signal can be adjusted if required, for synchronization with other devices.

Figure 5:
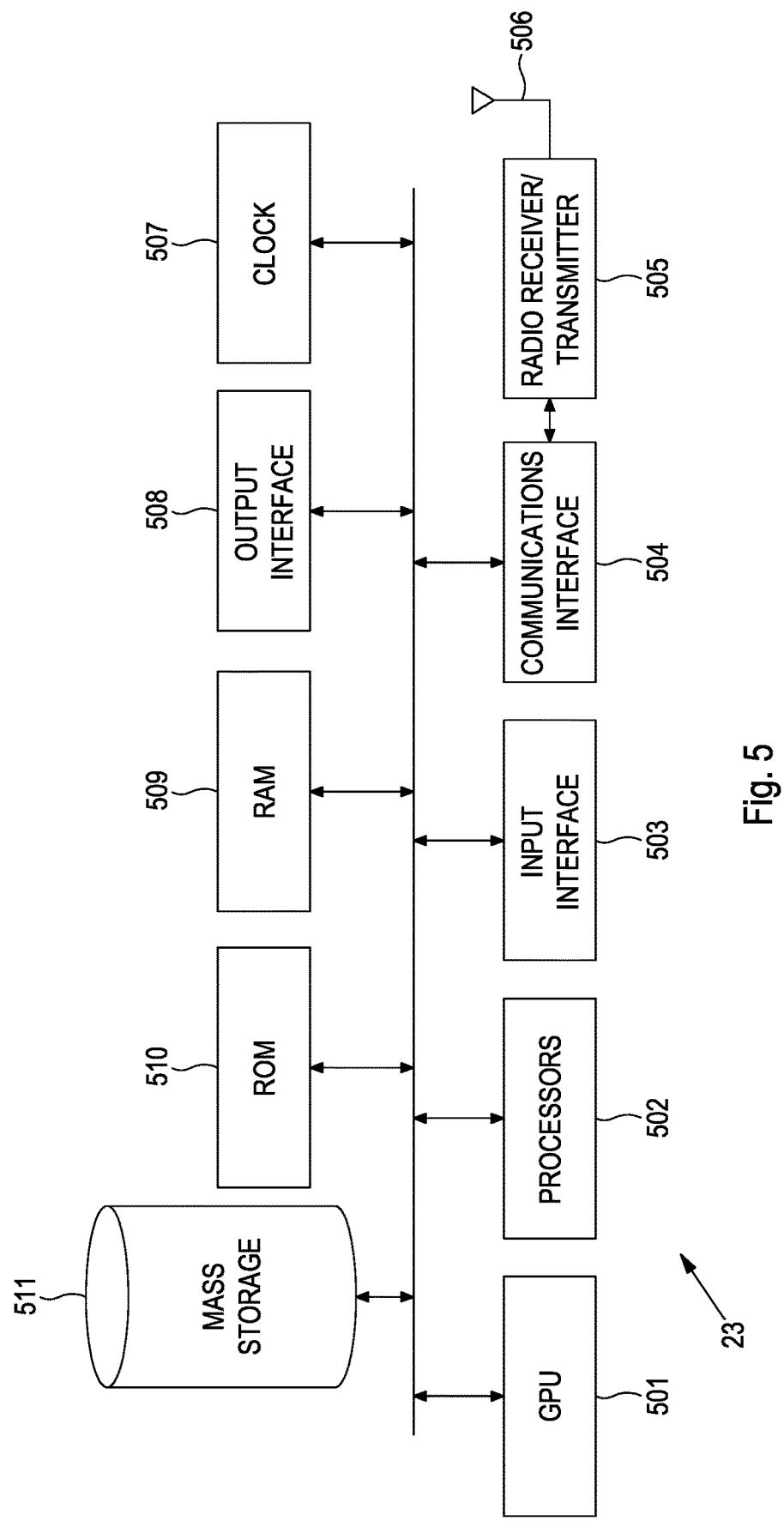
FIG. 5 illustrates the architecture of a user equipment device of the wireless network of FIG. 2.

FIG. 5 illustrates the architecture of a UE 23. As shown in FIG. 5, the UE 23 is a computer apparatus, in structure and function. It may share certain features with general purpose computer apparatus, but some features may be implementation specific, given the specialised function for which the UE 23 is to be put. The reader will understand which features can be of general-purpose type, and which may be required to be configured specifically for use in a user device.

The UE 23 thus comprises a parallel processor 501 configured for specific use in processing large data sets, suitable for use in digital communication. The UE 23 also comprises one or more other processors 502, either generally provisioned, or configured for other purposes such as mathematical operations, audio processing, managing a communications channel, and so on.

An input interface 503 provides a facility for receipt of user input actions. Such user input actions could, for instance, be caused by user interaction with a specific input unit including one or more control buttons and/or switches, a touchscreen, a keyboard, a mouse or other pointing device, a speech recognition unit enabled to receive and process speech into control commands, a signal processor configured to receive and control processes from another device such as a tablet or smartphone, or a remote-control receiver. This list will be appreciated to be non-exhaustive and other forms of input, whether user initiated or automated, could be envisaged by the reader.

Likewise, an output interface 508 is operable to provide a facility for output of signals to a user or another device. Such output could include a display signal for driving a local video display unit (VDU) or any other device.

A communications interface 504 implements a communications channel, whether broadcast or end-to-end, with one or more recipients of signals. In the context of the present embodiment, the communications interface is configured to cause emission and reception of signals via a receive/transmit interface 505 and a radio antenna 506.

The processors 501, 502 are operable to execute computer programs, in operation of the UE 23. In doing this, recourse is made to data storage facilities provided by a mass storage device 511 which is implemented to provide large-scale data storage albeit on a relatively slow access basis, and will store, in practice, computer programs and, in the current context, communication data, in preparation for execution of an encoding process prior to the placement of encoded data on a transmitted signal.

A Read Only Memory (ROM) 510 is preconfigured with executable programs designed to provide the core of the functionality of the UE 23, and a Random Access Memory 509 is provided for rapid access and storage of data and program instructions in the pursuit of execution of a computer program. Each of these is configured to implement a communications protocol adopted by plural interoperable devices.

A clock 507 provides a timing signal for all other components of the device. The clock signal can be adjusted if required, for synchronization with other devices.

Figure 6:
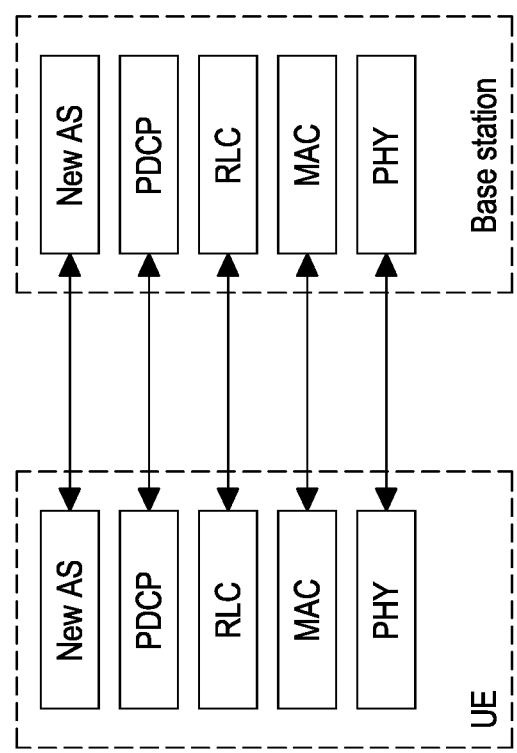
FIG. 6 illustrates a user plane protocol stack of the wireless network of FIG. 2.
Figure 7:
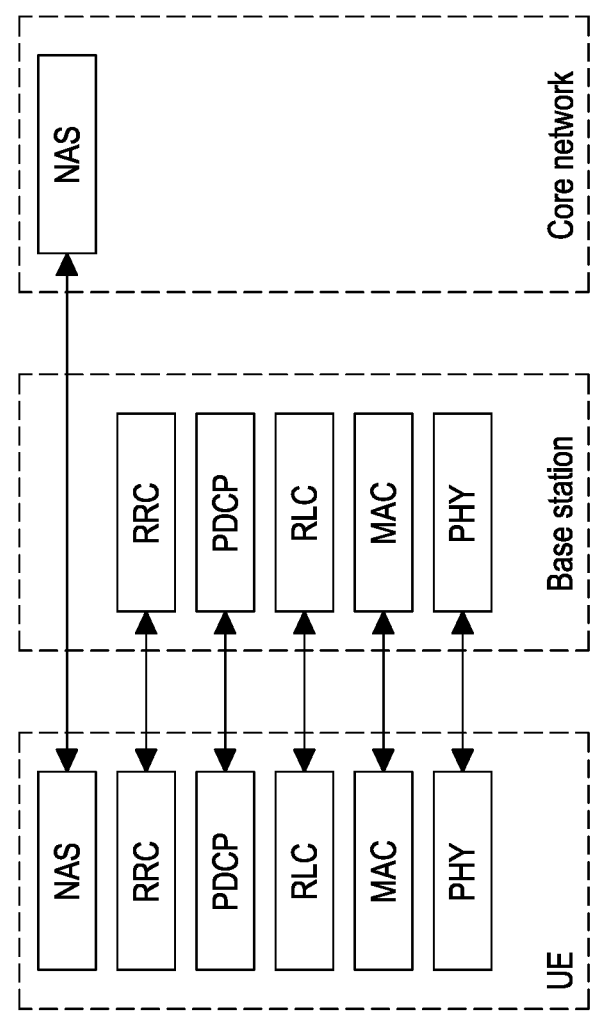
FIG. 7 illustrates a control plane protocol stack of the wireless network of FIG. 2.

FIG. 6 illustrates a user plane protocol stack of the wireless network. Further, FIG. 7 illustrates a control plane protocol stack for the wireless network. The terminology for the protocol stack layers is as follows:

PHY—Physical layer
MAC—Medium access control layer
RLC—Radio link control layer
PDCP—Packet data convergence protocol layer
RRC—Radio resource control layer
NAS—Non-access stratum layer
AS—Access stratum layer A network implemented as a 4G Long Term Evolution (LTE) network would have a similar architecture with a slightly different terminology for entities and interfaces. The 4G-LTE network has a similar protocol stack with the exception of the AS layer. However, the actual protocol layer functionality could be different for the two networks.

The new AS layer in 5G-NR is the service data adaptation protocol (SDAP) layer.

One of the main differences between 4G-LTE and 5G-NR is that the former uses a fixed numerology of 15 kHz orthogonal frequency division multiplexing (OFDM) sub-carrier spacing, whereas the latter supports a scalable numerology with sub-carrier spacing of 15 kHz, 30 kHz, and 60 kHz for below 6 GHz and 60 kHz and 120 kHz for above 6 GHz operation. A higher sub-carrier spacing leads to reduction in timeslot duration. In 4G-LTE, a slot comprises 14 OFDM symbols and corresponds to a transmission time interval (TTI). A reduction in TTI is possible through either scaling the sub-carrier spacing or fewer number of OFDM symbols. The following two terminologies are introduced:

Short TTI—A short TTI contains the same number of OFDM symbols as in 4G-LTE with a higher sub-carrier spacing (e.g., 30 kHz) or utilizes fewer number of OFDM symbols (e.g., 7, 3, or 2 symbols).

Mini-slot—A mini-slot can start at any OFDM symbol and it has variable length in terms of the number of OFDM symbols irrespective of the numerology.

Figure 8:
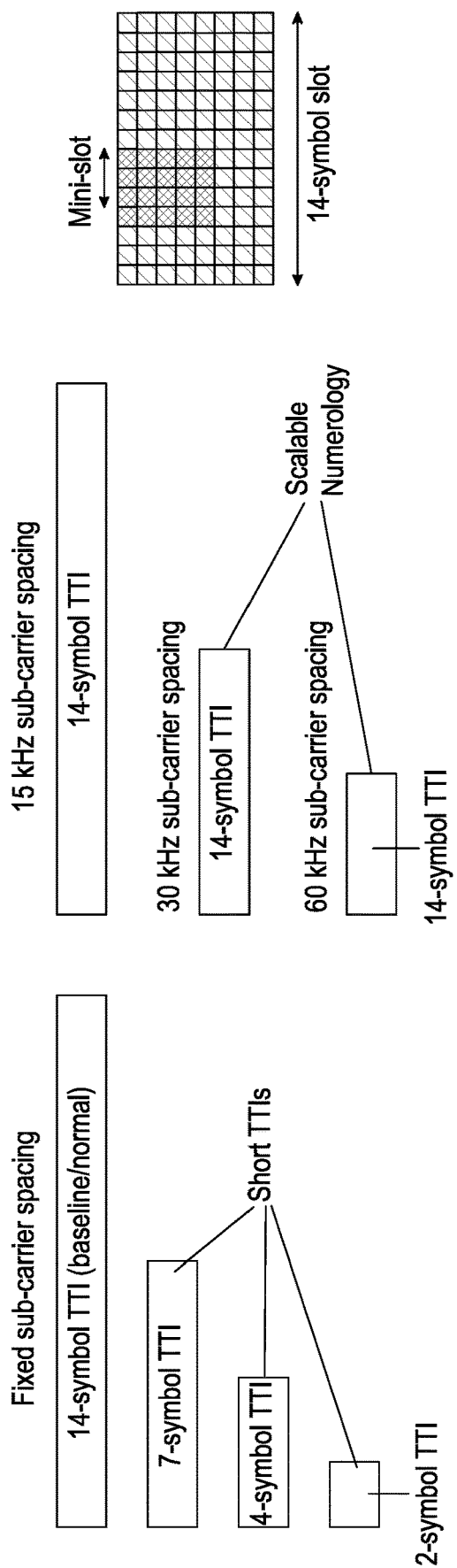
FIG. 8 illustrates the concept of scalable orthogonal frequency division multiplexing (OFDM)
Figure 9:
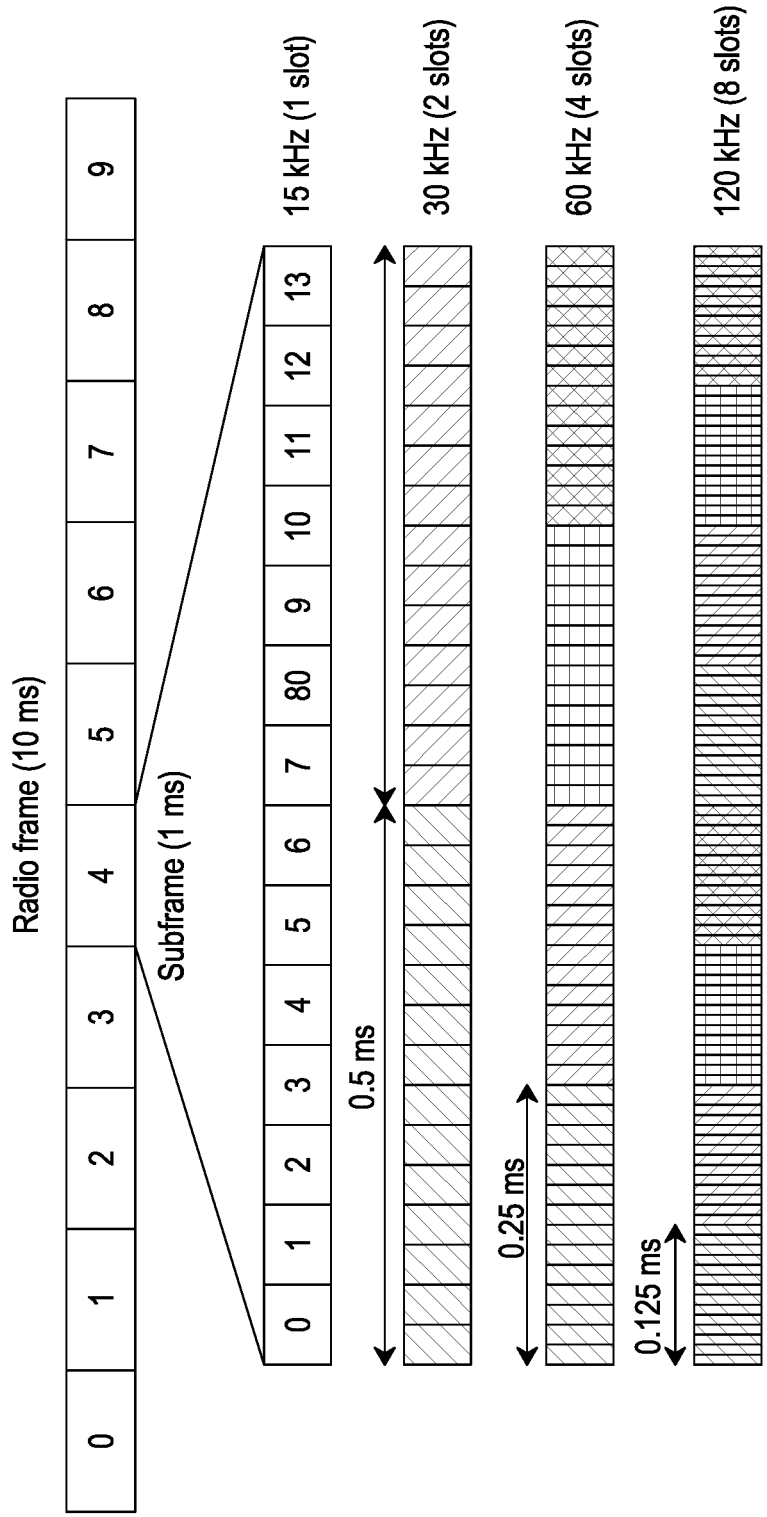
FIG. 9 illustrates the relationship between the number of slots per frame as a function of sub-carrier spacing.

FIG. 8 illustrates the concepts of scalable OFDM numerology. Both a short TTI and a mini-slot are illustrated. As detailed above, a short TTI contains the same number of OFDM symbols as in 4G-LTE with a higher sub-carrier spacing (e.g., 30 kHz) or utilizes fewer number of OFDM symbols (e.g., 7, 3, or 2 symbols), while a mini-slot can start at any OFDM symbol and it has variable length in terms of the number of OFDM symbols irrespective of the numerology. Note that the concept of short TTIs is applicable to a 4G system as well; however, mini-slots are specific to a 5G system only. FIG. 9 illustrates the relationship between the number of slots per frame as a function of sub-carrier spacing or numerology.

Figure 10:
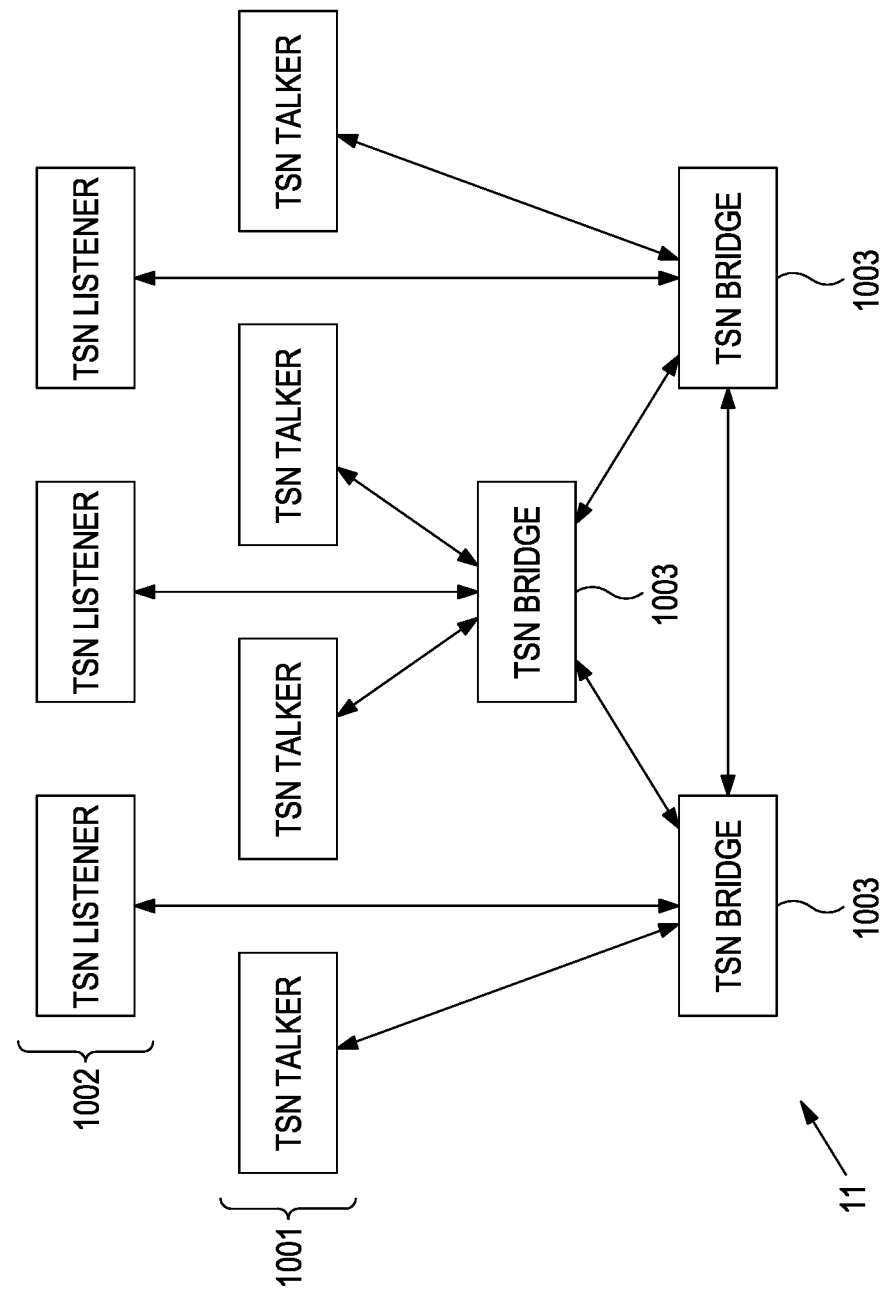
FIG. 10 illustrates a wired network implementing the time-sensitive network of FIG. 2, in the form of a fully distributed TSN model.

FIG. 10 illustrates an example of a fully distributed TSN model. This TSN model implements the wired network 11 of FIG. 1. As shown, the TSN network 11 comprises a plurality of TSN end stations, namely TSN talkers 1001 (controllers, sensors, etc.) and TSN listeners 1002 (actuators, robots, etc.) sharing information over a TSN network comprising of one or more TSN bridges 1003.

Figure 11:
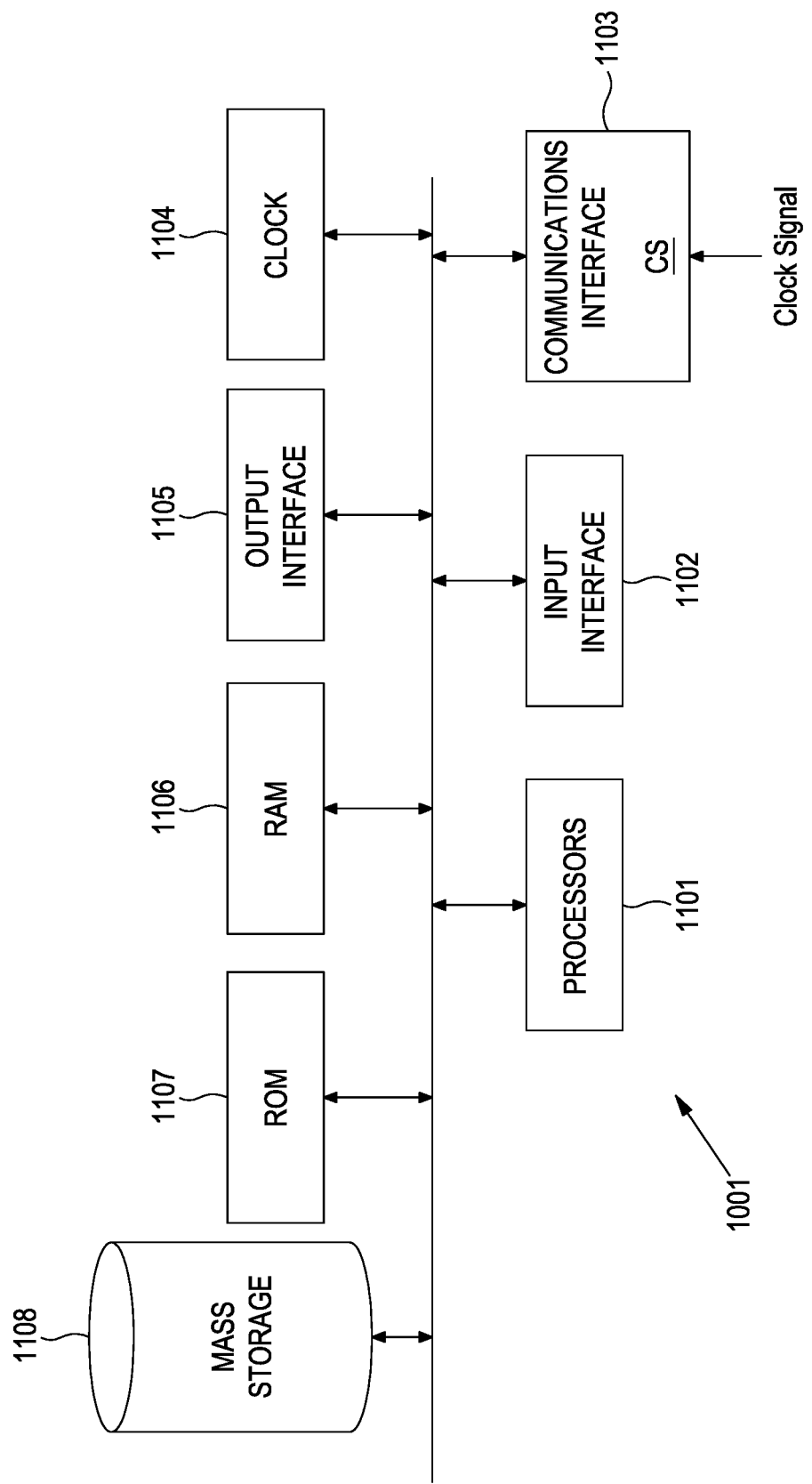
FIG. 11 illustrates a "talker" network element of the wired network of FIG. 10.

FIG. 11 illustrates internal architecture of a "talker" end station 1001, in accordance with the present embodiment. As shown in FIG. 11, the end station 1001 is a computer apparatus, in structure and function. It may share certain features with general purpose computer apparatus, but some features may be implementation specific, given the specialised function for which the station 1001 is to be put. The reader will understand which features can be of general-purpose type, and which may be required to be configured specifically for use in a user device.

The station 1001 thus comprises one or more processors 1101, either generally provisioned, or configured for other purposes such as mathematical operations, audio processing, managing a communications channel, and so on.

An input interface 1102 provides a facility for receipt of user input actions. Such user input actions could, for instance, be caused by user interaction with a specific input unit including one or more control buttons and/or switches, a touchscreen, a keyboard, a mouse or other pointing device, a speech recognition unit enabled to receive and process speech into control commands, a signal processor configured to receive and control processes from another device such as a tablet or smartphone, or a remote-control receiver. This list will be appreciated to be non-exhaustive and other forms of input, whether user initiated or automated, could be envisaged by the reader.

Likewise, an output interface 1105 is operable to provide a facility for output of signals to a user or another device. Such output could include a display signal for driving a local video display unit (VDU) or any other device.

A communications interface 1103 implements a communications channel, whether broadcast or end-to-end, with one or more recipients of signals. In the context of the present embodiment, the communications interface is configured to cause emission of control signals via an interface not shown for reasons of clarity, for control of other equipment not within the scope of this disclosure. Such equipment could include industrial equipment or the like. The communications interface 1103, as shown, has a clock slave port CS through which it can be in receipt of a clock signal from another device to which it has a wired connection.

The processors 1101 are operable to execute computer programs, in operation of the end station 1001. In doing this, recourse is made to data storage facilities provided by a mass storage device 1108 which is implemented to provide large-scale data storage albeit on a relatively slow access basis, and will store, in practice, computer programs and data as the need arises.

A Read Only Memory (ROM) 1107 is preconfigured with executable programs designed to provide the core of the functionality of the end station 1001, and a Random Access Memory 1106 is provided for rapid access and storage of data and program instructions in the pursuit of execution of a computer program. Each of these is configured to implement a communications protocol adopted by plural interoperable devices.

A clock 1104 provides a timing signal for all other components of the device. The clock signal is adapted to trigger on the basis of the received clock signal at the CS port, and can be adjusted if required, for synchronization with other devices.

Figure 12:
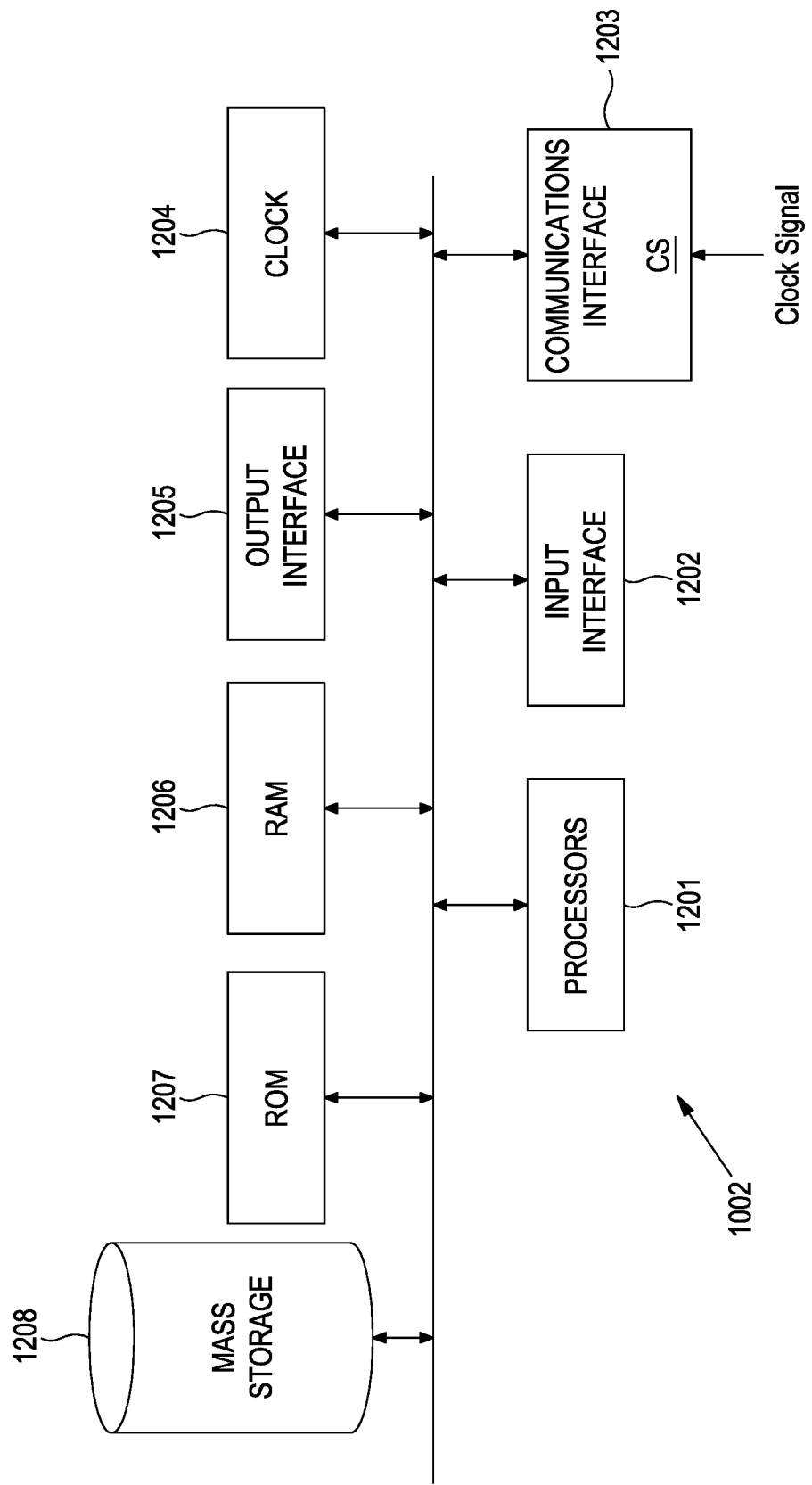
FIG. 12 illustrates a "listener" network element of the wired network of FIG. 10.

FIG. 12 illustrates internal architecture of a "listener" end station 1002, in accordance with the present embodiment. As shown in FIG. 12, the end station 1002 is a computer apparatus, in structure and function. It may share certain features with general purpose computer apparatus, but some features may be implementation specific, given the specialised function for which the station 1002 is to be put. The reader will understand which features can be of general-purpose type, and which may be required to be configured specifically for use in a user device.

The station 1002 thus comprises one or more processors 1201, either generally provisioned, or configured for other purposes such as mathematical operations, audio processing, managing a communications channel, and so on.

An input interface 1202 provides a facility for receipt of user input actions. Such user input actions could, for instance, be caused by user interaction with a specific input unit including one or more control buttons and/or switches, a touchscreen, a keyboard, a mouse or other pointing device, a speech recognition unit enabled to receive and process speech into control commands, a signal processor configured to receive and control processes from another device such as a tablet or smartphone, or a remote-control receiver. This list will be appreciated to be non-exhaustive and other forms of input, whether user initiated or automated, could be envisaged by the reader.

Likewise, an output interface 1205 is operable to provide a facility for output of signals to a user or another device. Such output could include a display signal for driving a local video display unit (VDU) or any other device.

A communications interface 1203 implements a communications channel, whether broadcast or end-to-end, with one or more recipients of signals. In the context of the present embodiment, the communications interface is configured to cause emission of control signals via an interface not shown for reasons of clarity, for control of other equipment not within the scope of this disclosure. Such equipment could include industrial equipment or the like. The communications interface 1203, as shown, has a clock slave port CS through which it can be in receipt of a clock signal from another device to which it has a wired connection.

The processors 1201 are operable to execute computer programs, in operation of the end station 1002. In doing this, recourse is made to data storage facilities provided by a mass storage device 1208 which is implemented to provide large-scale data storage albeit on a relatively slow access basis, and will store, in practice, computer programs and data as the need arises.

A Read Only Memory (ROM) 1207 is preconfigured with executable programs designed to provide the core of the functionality of the end station 1002, and a Random Access Memory 1206 is provided for rapid access and storage of data and program instructions in the pursuit of execution of a computer program. Each of these is configured to implement a communications protocol adopted by plural interoperable devices.

A clock 1204 provides a timing signal for all other components of the device. The clock signal is adapted to trigger on the basis of the received clock signal at the CS port, and can be adjusted if required, for synchronization with other devices.

Figure 13:
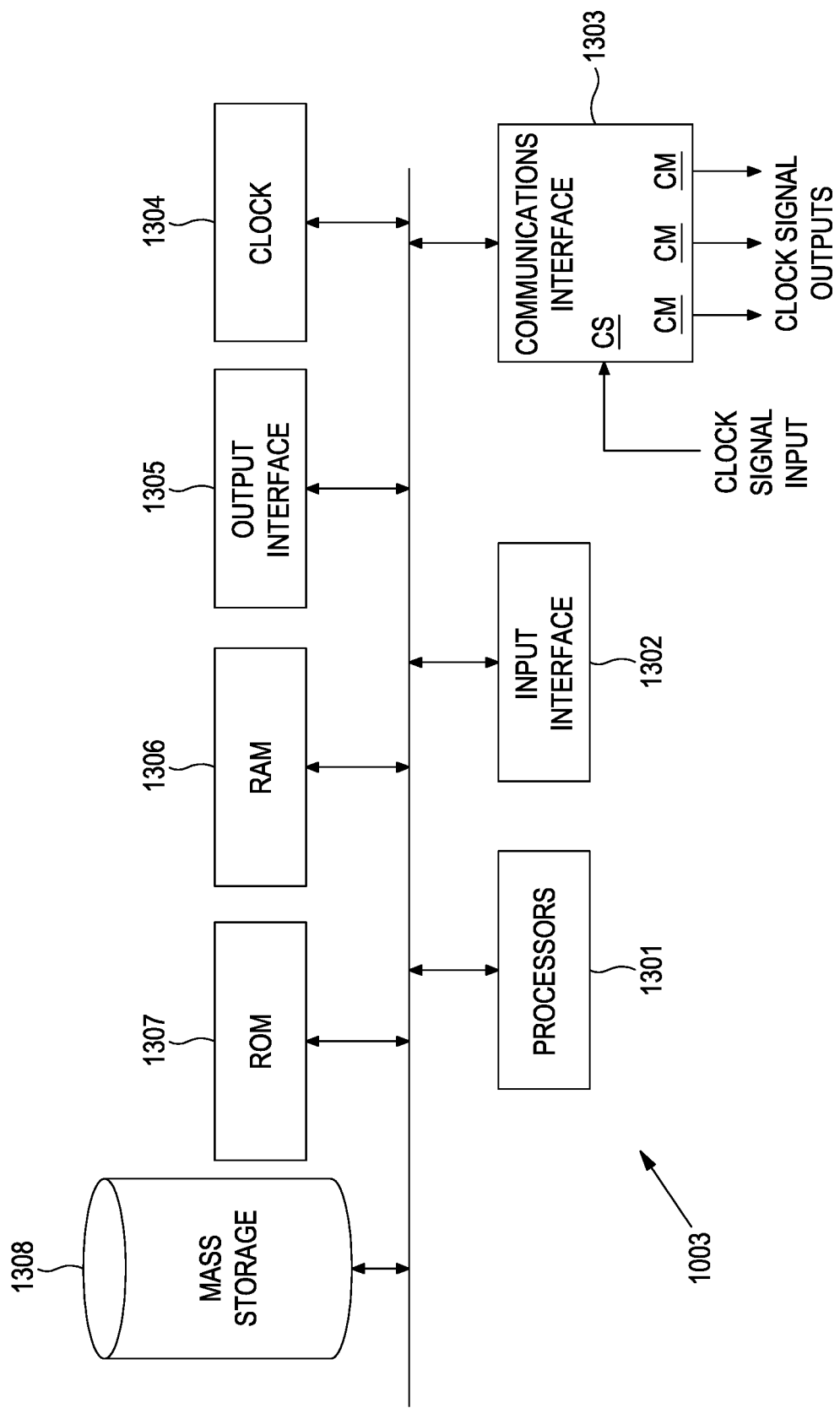
FIG. 13 illustrates a TSN bridge of the wired network of FIG. 10.

FIG. 13 illustrates the internal architecture of a TSN bridge 1003 in accordance with the present embodiment. As shown in FIG. 13, the bridge 1003 is a computer apparatus, in structure and function. It may share certain features with general purpose computer apparatus, but some features may be implementation specific, given the specialised function for which the bridge 1003 is to be put. The reader will understand which features can be of general-purpose type, and which may be required to be configured specifically for use in a user device.

The bridge 1003 thus comprises one or more processors 1301, either generally provisioned, or configured for other purposes such as mathematical operations, audio processing, managing a communications channel, and so on.

An input interface 1302 provides a facility for receipt of user input actions. Such user input actions could, for instance, be caused by user interaction with a specific input unit including one or more control buttons and/or switches, a touchscreen, a keyboard, a mouse or other pointing device, a speech recognition unit enabled to receive and process speech into control commands, a signal processor configured to receive and control processes from another device such as a tablet or smartphone, or a remote-control receiver. This list will be appreciated to be non-exhaustive and other forms of input, whether user initiated or automated, could be envisaged by the reader.

Likewise, an output interface 1305 is operable to provide a facility for output of signals to a user or another device. Such output could include a display signal for driving a local video display unit (VDU) or any other device.

A communications interface 1303 implements a communications channel, whether broadcast or end-to-end, with one or more recipients of signals. In the context of the present embodiment, the communications interface is configured to cause onward transmission of signals received at the device, intended for another destination. The communications interface 1303, as shown, has a clock slave port CS through which it can be in receipt of a clock signal from another device to which it has a wired connection. Further, the communications interface 1303 comprises one or more clock master ports CM which, when activated, cause emission of a master clock signal for used by other connected devices.

The processors 1301 are operable to execute computer programs, in operation of the bridge 1003. In doing this, recourse is made to data storage facilities provided by a mass storage device 1308 which is implemented to provide large-scale data storage albeit on a relatively slow access basis, and will store, in practice, computer programs and data as the need arises.

A Read Only Memory (ROM) 1307 is preconfigured with executable programs designed to provide the core of the functionality of the bridge 1003, and a Random Access Memory 1306 is provided for rapid access and storage of data and program instructions in the pursuit of execution of a computer program. Each of these is configured to implement a communications protocol adopted by plural interoperable devices.

A clock 1304 provides a timing signal for all other components of the device. The clock signal is adapted to trigger on the basis of the received clock signal at the CS port, and can be adjusted if required, for synchronization with other devices.

To realize converged operation in a composite network, there must be seamless (tight) integration between 5G and TSN systems. One of the main approaches proposed in 3GPP Release 16 is the bridge model wherein the 5G system appears as a virtual TSN bridge or a black box to the TSN system.

Figure 14:
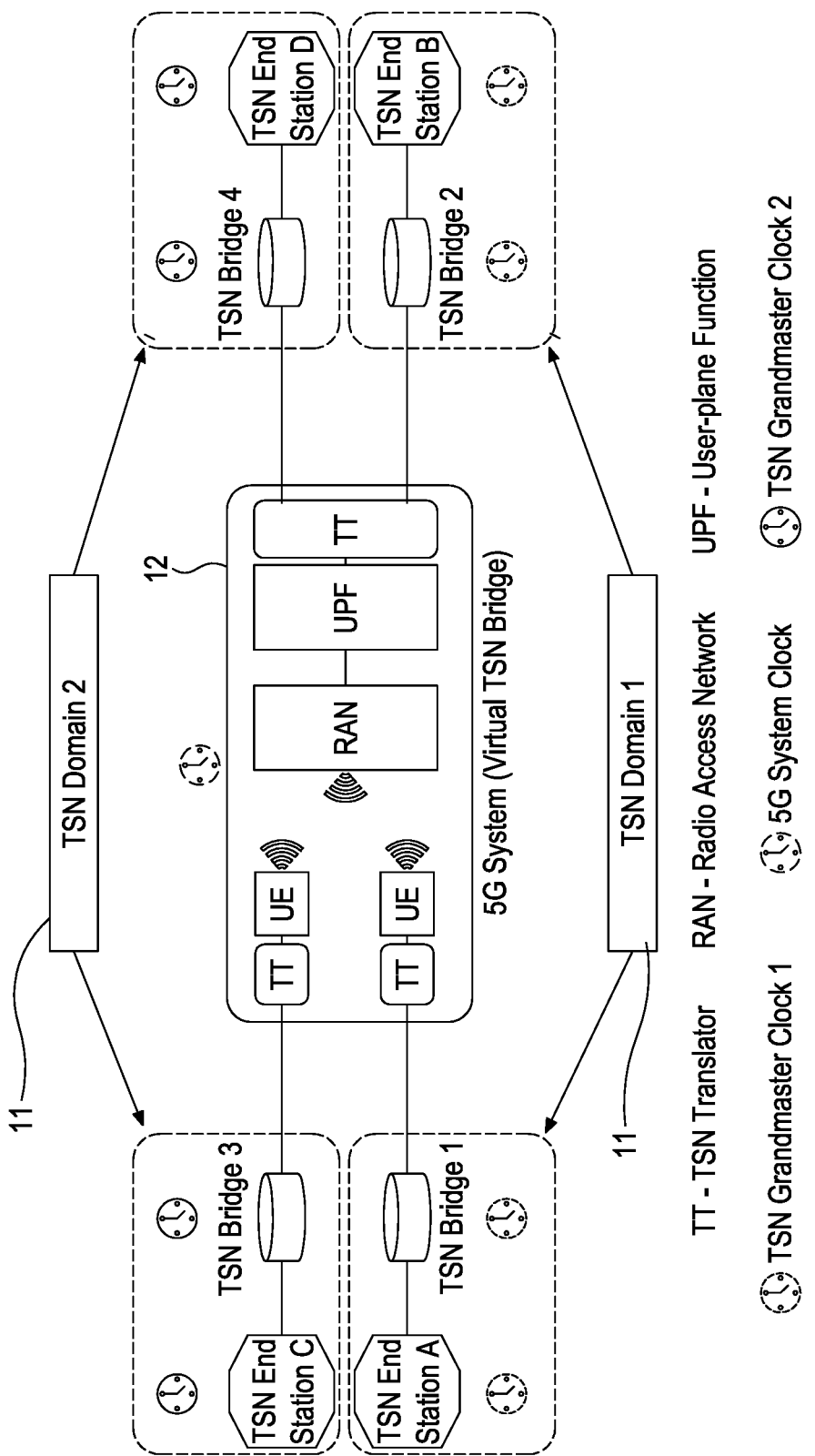
FIG. 14 illustrates a composite, or hybrid, network according to an embodiment.

FIG. 14 illustrates a composite, or hybrid, network according to an embodiment. The network is a bridge model wherein the wireless system 12 provides ingress and egress ports for the wired (TSN) system 11 via the TSN Translators (TTs). Such TTs, which are used for both control-plane and user-plane, are located on the user-equipment (UE) side as well as network side. The wireless system handles TSN service requirements through its internal protocols.

The wireless (5G) system 12 provides virtual bridge functionality to multiple TSN domains, i.e TSN Domain 1 and TSN Domain 2. This implies that the 5G system must transmit traffic (in an end-to-end manner) belonging to different TSN domains within fixed-length cycles (time windows). Therefore, end-to-end optimization of a 5G system becomes particularly important for providing performance guarantees for single domain as well as multi-domain TSN systems.

Without any loss of generality, a centralized configuration model is considered for TSN and 5G integration where the centralized network controller (CNC), is responsible for configuration and management of the integrated system. It is assumed that each TSN domain operates according to a schedule derived by the CNC.

Packet scheduling is a key air-interface resource allocation mechanism in state-of-the-art 4G/5G cellular networks. Designing an optimized packet scheduling technique is crucial in meeting the quality of service (QoS) requirements while maximizing system-level performance in terms of spectral efficiency and resource utilization. Broadly, packet scheduling techniques can be categorized into dynamic scheduling and semi-persistent scheduling. In case of dynamic scheduling, the scheduling grants/assignments are sent dynamically for the users to be scheduled. In the case of semi-persistent scheduling, users are scheduled on a fixed/static basis such that an initial grant/assignment provides reservation of resources for periodic transmissions.

Most industrial control applications are characterized by periodic traffic arrival patterns. Owing to the use of centralized time-aware shapers (TAS) in wired (TSN) systems, the traffic arriving at a TSN entity (e.g., a bridge) is also periodic in nature. Therefore, it can also be assumed that the TSN traffic arriving at the ingress point of a 5G system would be periodic in nature. However, the traffic arriving at the radio access network (RAN) may not be periodic due to various factors. First, the TSN traffic originates outside the 5G system. Hence, the traffic arrival time at the radio access network (RAN) is affected by the transport delay (between the RAN and the core network) and the processing delay at intermediate entities. Note that this is significantly different from voice over IP (VoIP) traffic which originates within the RAN, and therefore its periodicity is guaranteed. Second, the TSN traffic is periodic in TSN time base; however, relative time and frequency offsets between 5G and TSN system clocks lead to aperiodic traffic arrival at the RAN. Third, in some deployments, the external TSN system might be based on cyclic queuing and forwarding (CQF) strategy wherein traffic is forwarded with priority. Hence, traffic periodicity at the RAN is not guaranteed. Fourth, pre-emption in the TSN network may lead to traffic arrival in the RAN outside expected intervals.

Since the TSN traffic arriving in the RAN may not be periodic, the use of semi-persistent scheduling techniques (which are typically used for periodic applications) would lead to degradation in spectral efficiency and resource utilization due to unnecessary wastage of air-interface resources. It is also important to mention that resource reservation (as used in semi-persistent techniques) becomes impractical as the number of TSN domains sharing the 5G network increases. Moreover, resource reservation for TSN traffic may not always be feasible as certain slots in the 5G system are fixed for carrying control-plane traffic.

Figure 15:
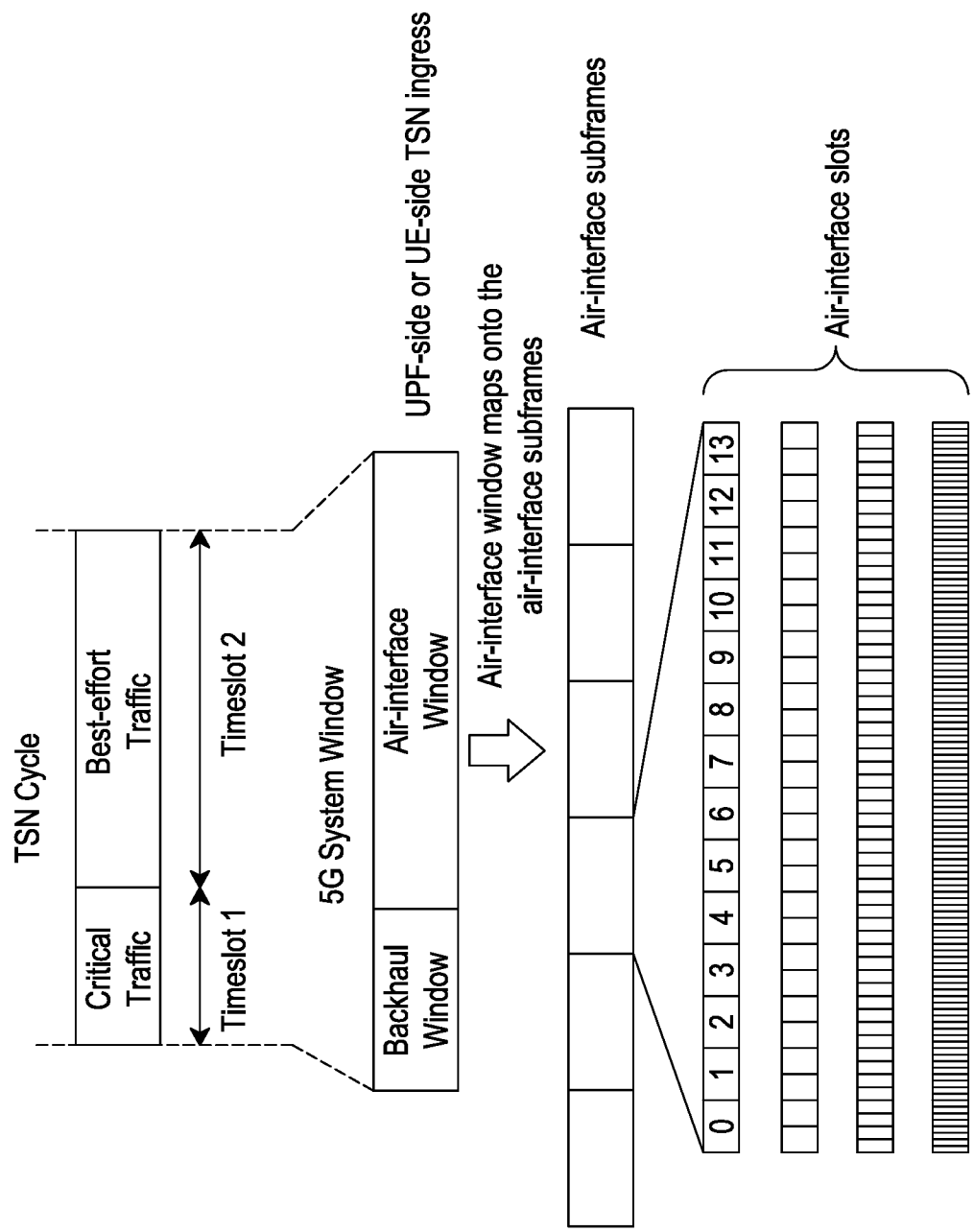
FIG. 15 illustrates the TSN communication cycle and the 5G system window.

FIG. 15 shows the TSN communication cycle and the 5G system window. The TSN communication cycle is typically split into dedicated timeslots for critical (e.g., control) traffic and best-effort traffic. Irrespective of the ingress point in the 5G system (i.e., UE-side or UPF-side), the TSN cycle enforces a time window on the 5G system for delivery of TSN traffic.

Figure 16:
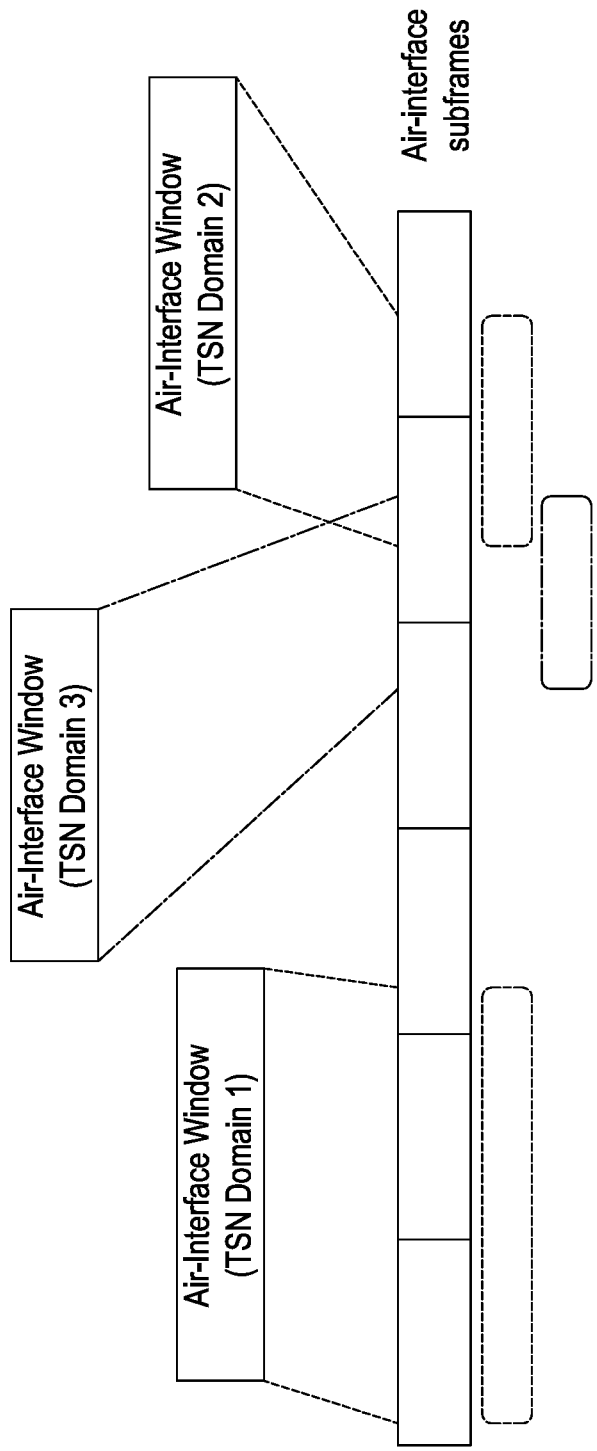
FIG. 16 illustrates multiple air-interface windows mapping onto the air-interface subframes.

The 5G system window is split into a backhaul window and an air-interface window. Both windows dictate the time interval for transmission on each interface. The air-interface window maps onto the air-interface subframes as illustrated in FIG. 15 and FIG. 16. As shown in FIG. 16, in a multi-domain TSN system, more than one window of varying durations maps onto the air-interface subframes. In some cases, windows belonging to different TSN domains overlap on the air-interface.

Figure 17A:
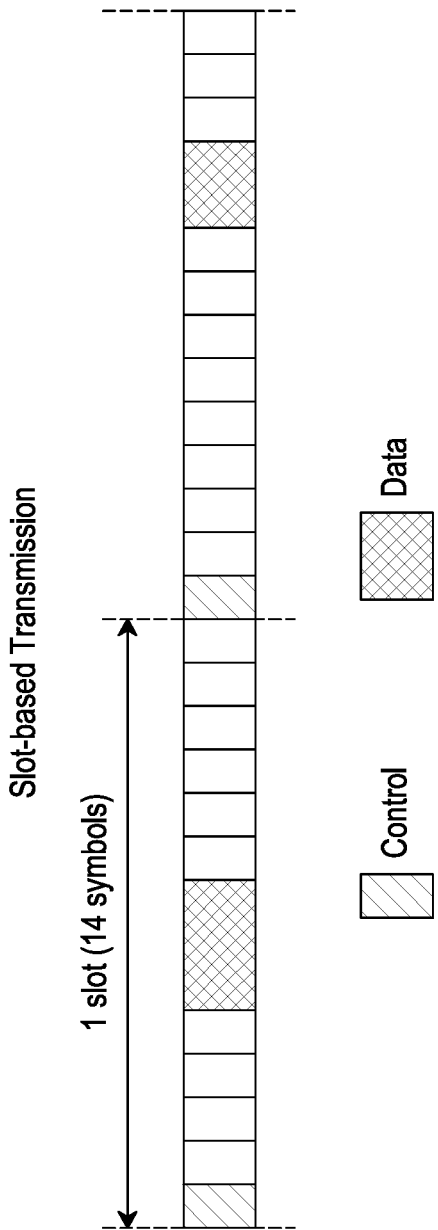
FIG. 17a illustrates the concept of slot-based transmission (SBT)

FIG. 17a illustrates the concept of slot-based transmission (SBT). In case of SBT, the UE receives the scheduling grant in the control channel defined at the beginning of the slot. The UE is scheduled for data transmission on a data channel within the slot, wherein the data channel corresponds to an OFDM symbol. For downlink scheduling, the control and data channels correspond to the physical downlink control channel (PDCCH) and the physical downlink shared channel (PDSCH).

Figure 17B:
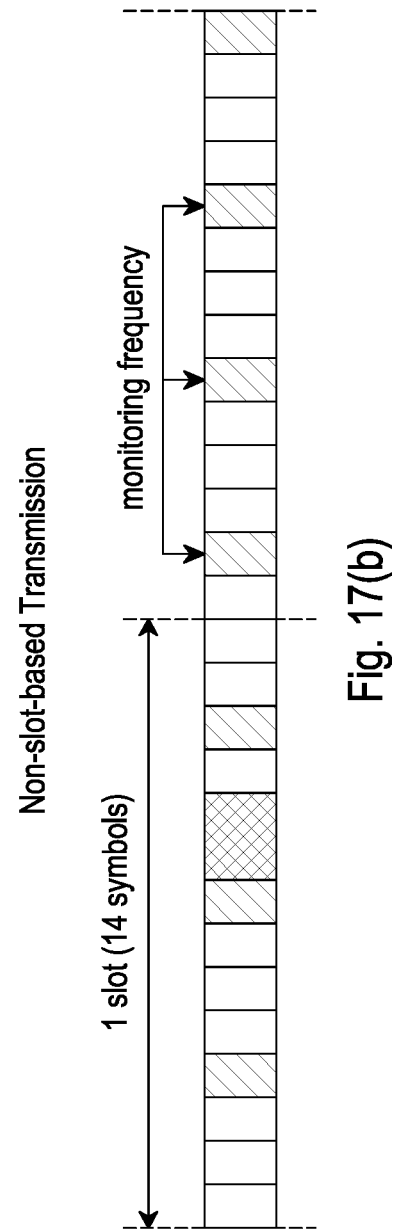
FIG. 17b illustrates the concept of non-slot-based transmission (NSBT)

FIG. 17b illustrates the concept of non-slot-based transmission (NSBT). In this case, the UE is configured by the Radio Resource Control (RRC layer) with a search space for the resources to monitor. When the control information is received, the subsequent symbols contain data. For example, FIG. 17b shows a monitoring frequency of 4 OFDM symbols per slot.

Scheduling of an Air-Interface Window

Figure 18:
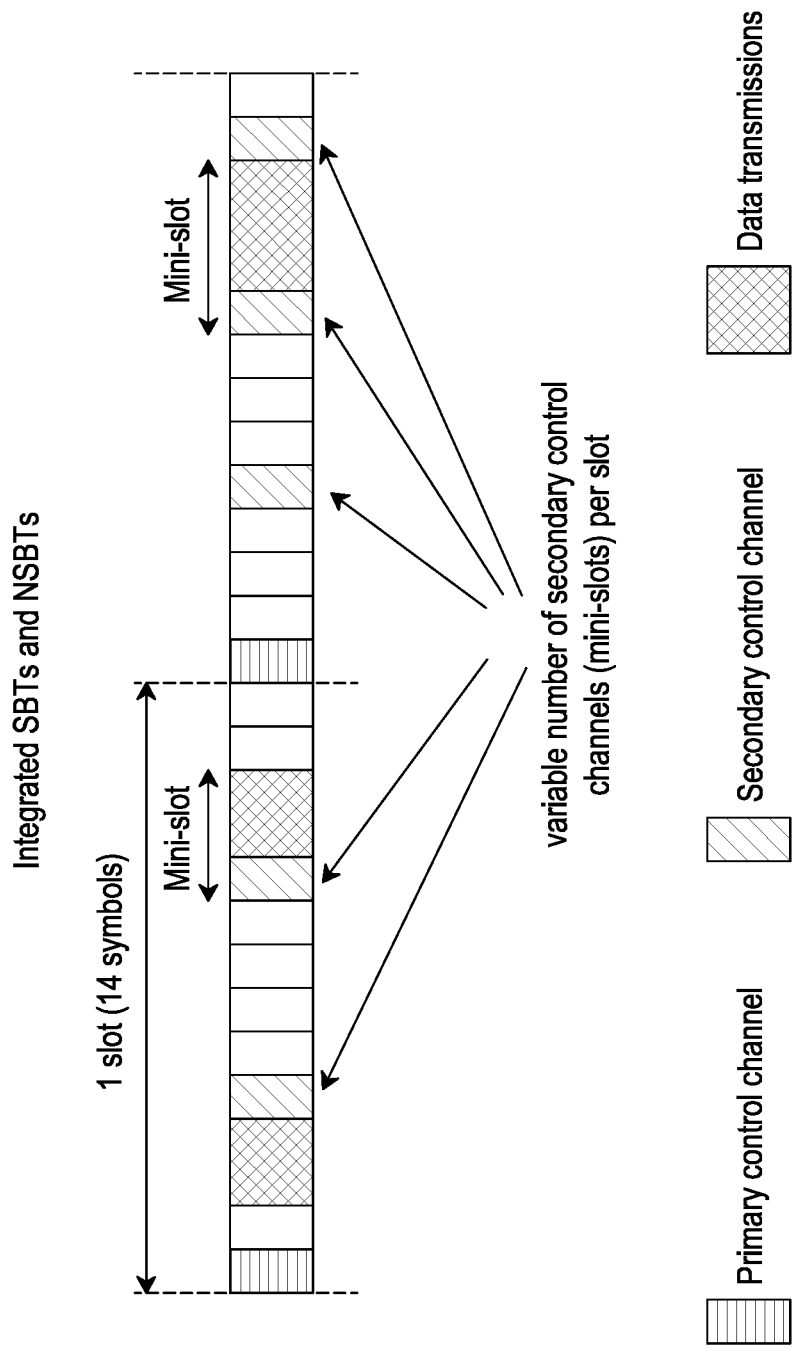
FIG. 18 illustrates integrated slot-based transmission and non-slot-based transmission according to an embodiment.

FIG. 18 illustrates integrated slot-based transmission and non-slot-based transmission according to an embodiment. Two different types of control channels are used: a primary control channel defined at the beginning of the slot and a variable number of secondary control channels defined within the slot. Each secondary control channel defines a possible mini-slot within the slot.

The primary control channels are pre-defined while the secondary control channels can be dynamically scheduled. A UE obtains radio resources through allocation in a primary control channel or via one or more secondary control channels. The primary control channel may also include additional information related to control plane, such as synchronization messages.

Such integrated SBTs and NSBTs provide flexibility of scheduling critical TSN traffic on fine timescales with minimal latency. UEs can be scheduled via primary as well as secondary control channels. Moreover, a variable number of OFDM symbols provide the capability of adapting scheduling resources as per traffic demands. This avoids unnecessary monitoring of resources when traffic is less frequent.

Figure 19:
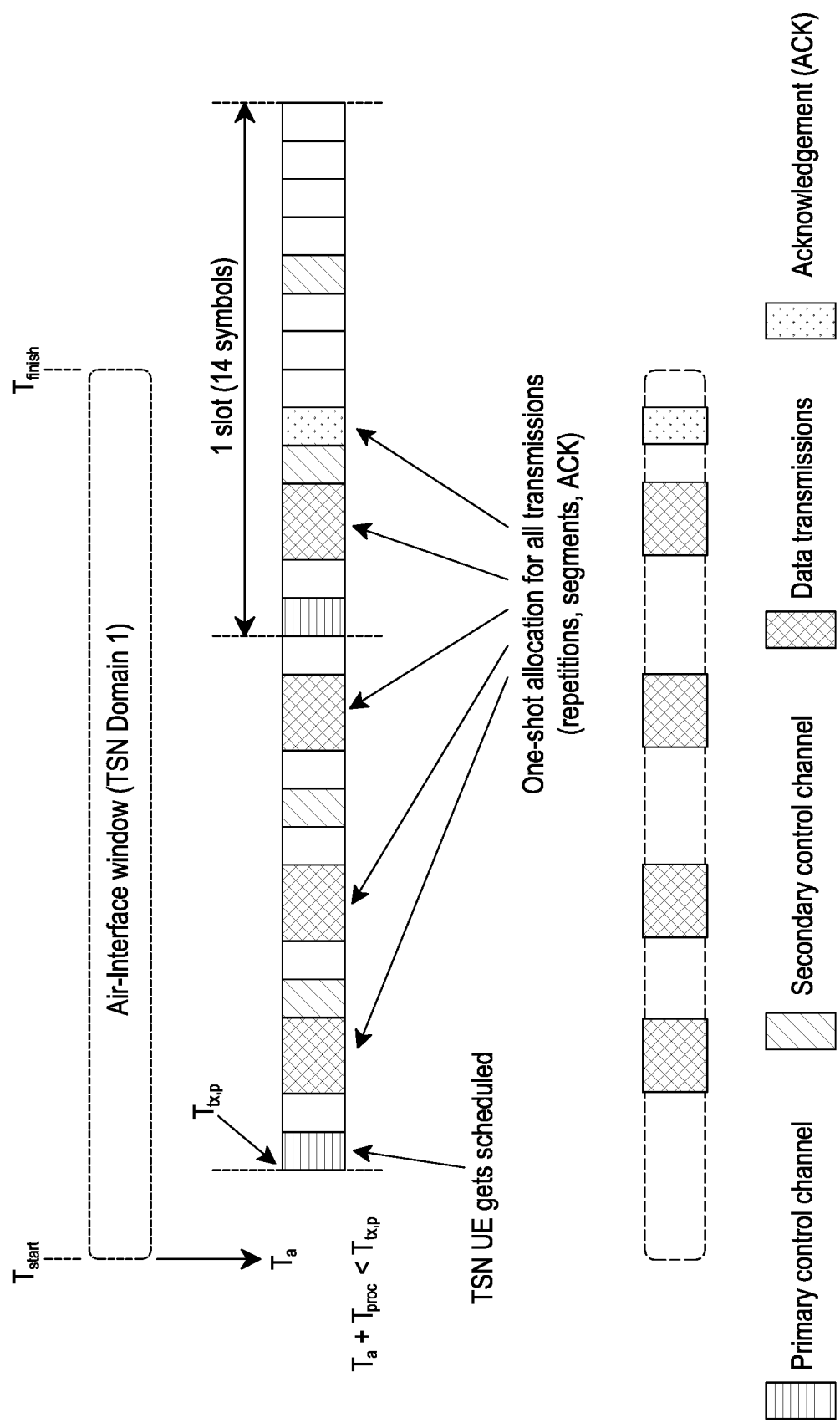
FIG. 19 illustrates a resource allocation procedure according to an embodiment.

FIG. 19 illustrates a resource allocation procedure for an air-interface window corresponding to a TSN cycle of any TSN domain. It is assumed that a protocol data unit (PDU) session has been established between the TSN UE and the UPF. TSN frames are exchanged between the UPF and the UE through the PDU session.

The air-interface window starts at time $T_{start}$ and ends at time $T_{finish}$. It is assumed that there is a single TSN frame belonging to critical control traffic that needs to be transmitted within this window. In order to meet end-to-end latency requirements pertaining to a TSN cycle, the TSN frame must be transmitted within the air-interface window.

For data arriving at the base station for a TSN UE, the processing delay at the base station needs to be accounted for before a TSN UE is scheduled.

Consider that $T_a + T_{proc} < T_{tx,p}$, such that $T_a$ is the start time of the TSN air-interface window on the 5G air-interface, $T_{proc}$ is the processing delay at the base station and $T_{tx,p}$ is the time at which the primary control channel is transmitted on the air-interface. This implies that the TSN UE can be scheduled via the primary control channel. The system implements a one-shot allocation strategy based on a hybrid scheduling approach. The resource allocation for an air-interface window is handled dynamically. However, resource allocation for transmissions pertaining to the window is handled on a fixed basis.

The base station may schedule multiple transmissions within the air-interface window. For example, a single transmission may be repeated for a fixed number of times for enhanced reliability. This may be referred to as "bundled transmissions". The number of bundles may be dynamically adjusted based on channel conditions.

Furthermore, PDUs arriving at the MAC layer might be segmented at the RLC layer based on the size of the MAC layer transport block. The information regarding the number of segments is available from the RLC layer. Therefore, the MAC layer knows the total number of transmissions pertaining to the TSN frame that needs to take place within the air-interface window.

In FIG. 19 the TSN frame coming from higher layers has been segmented into two PDUs at the RLC layer. It is assumed that the bundle value for the TSN UE is two, i.e., a transmission must be repeated for the sake of enhanced reliability. Therefore, the base station schedules 4 transmissions within the air-interface window such that each transmission spans two OFDM symbols in the time domain. Note that the transmission scheduled for the TSN UE span two slots on the air-interface. A single block acknowledgement (ACK) for all transmissions is assumed. As part of one-shot allocation, the base station (gNB) allocates radio resources for transmission of ACK from the TSN UE.

Figure 20:
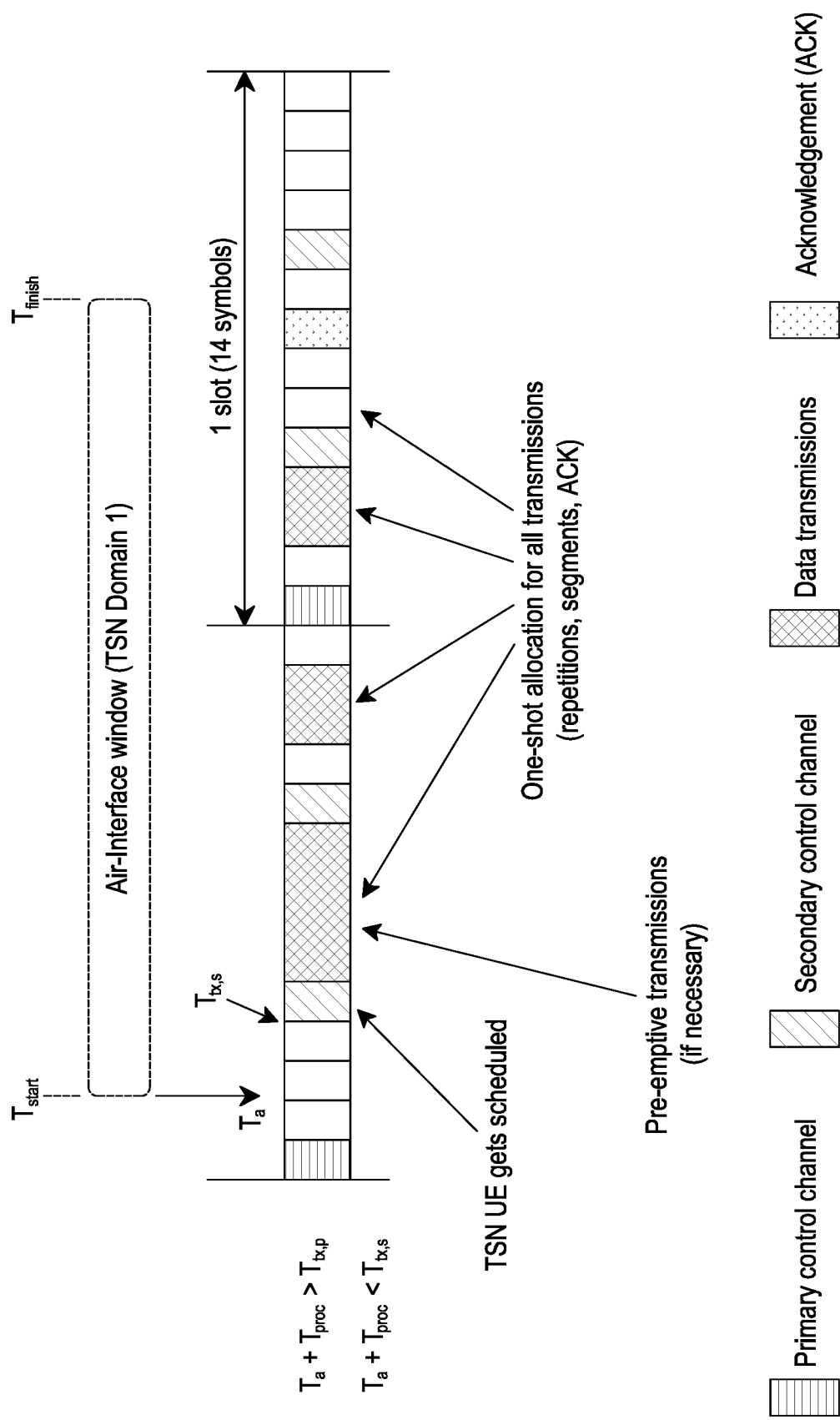
FIG. 20 illustrates a resource allocation procedure according to an embodiment.

FIG. 20 illustrates a resource allocation procedure for an air-interface window corresponding to a TSN cycle of any TSN domain. It is assumed that a protocol data unit (PDU) session has been established between the TSN UE and the UPF. TSN frames are exchanged between the UPF and the UE through the PDU session.

Consider that $T_a + T_{proc} > T_{tx,p}$, i.e., the air-interface window begins after the primary control channel; however, it starts before transmission of a secondary control channel, i.e., $T_a + T_{proc} \, T_{tx,s}$. As shown in FIG. 20, the TSN UE gets scheduled through the secondary control channel. The 4 transmissions (each of duration 2 symbols) for the TSN UE are scheduled across two slots on the air-interface.

Figure 21:
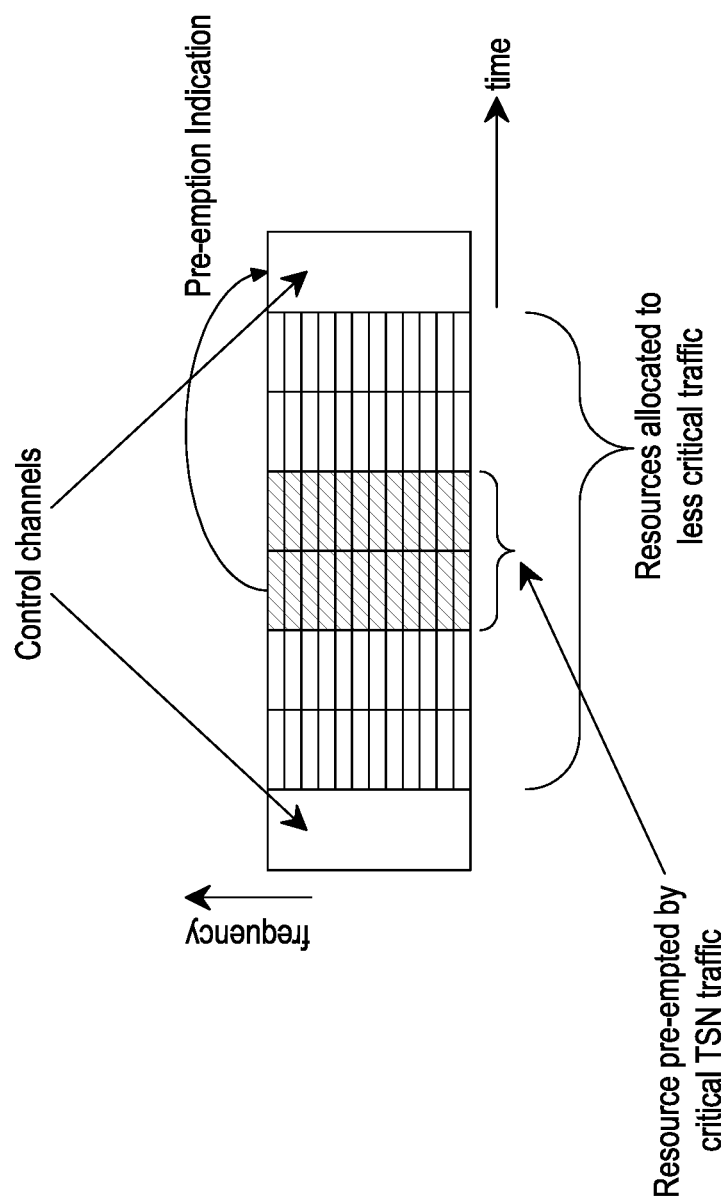
FIG. 21 illustrates the concept of pre-emptive transmissions.

FIG. 21 illustrates the concept of pre-emptive transmissions. Any mini-slot for critical control TSN traffic can pre-empt (overwrite) ongoing transmissions belonging to less critical traffic. Pre-emptive transmissions might be necessary if resources in a slot have been previously allocated to less critical traffic based on preceding primary or secondary control channels. The punctured resources are communicated to the pre-empted UEs via the next primary control channel containing a pre-emption indication and new allocation information for retransmissions. Due to the dynamic scheduling of secondary control channels, they are not used for communicating the punctured resources to the pre-empted UEs.

FIG. 22 outlines a method for scheduling of an air-interface window.

In S2201, an air-interface window associated with a TSN domain begins at time $T_a$. A TSN UE in the TSN Domain wishes to send a TSN frame within the air-interface window. In Step S2202, the base station computes the number of required transmissions for the frame. This includes any segmentation of the frame or repeat transmissions required, as detailed previously.

In S2203, it is determined whether the start time of the air-interface $T_a$ combined with the processing delay at the processing delay at the base station, $T_{proc}$, is before the transmission of the primary control channel on the air-interface of the wireless network $T_{tx,p}$.

If $T_a + T_{proc} < T_{tx,p}$, then at S2204, the TSN UE is scheduled for transmission of the frame through the primary control channel.

Otherwise, at S2205, it is checked whether there are secondary control channels within the slot on the air-interface. If so, then at S2207 the TSN UE is scheduled for transmission of the frame through the secondary control channel. Otherwise, the TSN UE is scheduled for transmission of the frame through the next primary control channel (S2206 and S2204).

At S2208, the base station schedules the required transmissions for the frame within the duration of the air-interface window. The transmissions for the frame are then transmitted over the air-interface (S2209).

Multi-Domain Scheduling

In an embodiment, an integrated time and frequency domain scheduling approach is utilised for multi-domain TSN scheduling. The concept of frequency resources in 5G-NR is illustrated in FIG. 23. A resource element is the smallest unit of resource grid. It comprises one OFDM subcarrier in the frequency domain and 1 OFDM symbol in time domain. A resource element group (REG) is made of one resource block comprising 12 resource elements in frequency domain and one symbol in frequency domain. Further, a REG bundle consists of multiple REGs. One REG bundle can be defined on a bandwidth part (BWP) which is a subset of the carrier bandwidth. BWP is a contiguous set of resource blocks (or REGs) selected from a contiguous subset of common resource blocks for a given numerology on a given carrier.

FIG. 24 illustrates the multi-domain TSN scheduling scenario for two TSN UEs—TSN UE 1 in TSN Domain 1 and TSN UE 2 in TSN Domain 2. The air-interface windows for TSN domain 1 and TSN domain 2 begin at time $T_{a,1}$ and $T_{a,2}$, respectively. It is assumed that a single TSN frame belonging to critical control traffic needs to be transmitted within the air-interface windows for both domains. Further, it is assumed that TSN UE 1 requires 4 transmissions whereas TSN UE 2 requires 3 transmissions.

FIG. 24 considers two slots on the air-interface such that each slot consists of 14 symbols (numbered 0 to 13). TSN UE 1 gets scheduled through the primary control channel. It's 4 transmissions are scheduled such that each transmission consists of two symbols in the time domain, i.e., transmission 1 on symbols 2 and 3, transmission 2 on symbols 6 and 7, transmission 3 on symbols 11 and 12, in the first slot and transmission 4 on symbols 2 and 3 in second slot. TSN UE 1 is allocated multiple REGs in each transmission as shown. Specifically, it is allocated REGs 1-3 and 7-9 in each transmission.

The multi-domain TSN scheduling strategy prioritizes time domain scheduling over frequency domain scheduling, i.e., scheduling opportunities in time domain are preferred. Moreover, it prioritizes earlier transmission opportunities over later transmission opportunities within an air-interface window. This provides additional margin for retransmission if a transmission is pre-empted. The TSN UE 2 gets scheduled through the second secondary channel in the first slot. Each of its transmissions span 1 symbol in time domain. Two of its transmissions are scheduled along with those of TSN UE 1, i.e., REGs 4-6 on symbol 11 of first slot and symbol 2 of second slot. It is assumed that REGs 10-12 are not available. Therefore, considering the latency requirements of air-interface window 2, the third transmission of TSN UE 2 can be scheduled in symbols 10 or 13 of first slot or symbol 2 of second slot. Based on the scheduling strategy, it would be scheduled in symbol 10 of the first slot.

The multi-domain TSN scheduling approach is defined by the following multi-objective optimization problem.

$\min(\Omega_L, U_{BWP}^{-1})$
subject to (i) $S_L^k \leq W_L^k \ \forall k \in K_s$
(ii) $N_{REG}^k \geq N_{min}^k \ \forall k \in K_s$
(iii) $U_{BWP} \geq U_{min}$ In this optimization problem $\Omega_L$ denotes the cumulative length of the scheduled window for all TSN domains, $U_{BWP}$ is the resource utilization of a bandwidth part (BWP), $K_s = \{1, 2, \ldots, K\}$ is the set of TSN UEs (domains) to be scheduled, $S_L^k$ is the scheduled length of the $k^{th}$ air-interface window, $W_L^k$ is the duration of the $k^{th}$ air-interface window, $U_{min}$ is the threshold for minimum resource utilization, $N_{REG}^k$ is the number of REGs allocated to the $k^{th}$ TSN UE, and $N_{min}^k$ is the minimum required REGs for the $k^{th}$ TSN UE.

The objective of the optimization problem is to minimize the overall length of scheduled transmissions in time domain and maximize the resource utilization of a BWP (comprising a bundle of REGs) while ensuring that the scheduled length of any air-interface window does not exceed the duration of an air-interface window and the utilization of frequency domain resources in a BWP exceeds a certain threshold.

FIG. 25 illustrates a low-complexity heuristic method for the optimization problem. The algorithm is repeated for each air-interface window (TSN UE) to be scheduled and for each scheduling opportunity.

In S2501, the air-interface windows to be scheduled are sorted in a descending order based on the remaining latency budget which is calculated as $T_{finish} - T_{tx,so}$ where $T_{tx,so}$ is the transmission time of a scheduling opportunity (primary or secondary control channel). In S2502, the base station (gNB) computes the number of required transmissions that need to be scheduled for a TSN frame to be transmitted in the air-interface window. This includes any segmentation of the frame or repeat transmissions required, as detailed previously.

In S2503, the base station (gNB) schedules transmissions as per the multi-domain one-shot allocation procedure which is explained later. After scheduling a TSN UE, the base station updates a pre-emption mapping (S2504). Such a mapping is crucial for pre-emptive transmissions if more critical air-interface windows (i.e., windows with lower latency budget) arrive at the air-interface later than less critical air-interface windows. The pre-emption mapping is illustrated as follows:

| Air-interface Window | No. of Pre-emptable transmissions | Latency Budget |
|---|---|---|
| TSN UE 2 | 2 | 7 symbols |
| TSN UE 1 | 1 | 3 symbols |

It considers the total number of transmissions of a TSN UE and the number of pre-emptable transmissions along with the latency budget (if transmissions are pre-empted). Once a UE is scheduled, the UE only monitors the primary control channels at the beginning of the slots. Therefore, the number of pre-emptable transmissions is determined by the number of transmissions that can be scheduled after the next primary control channel and before the end of the air-interface window. The latency budget also accounts for the symbols allocated for receiving ACK.

FIG. 26 illustrates one example of pre-emptable transmissions. The first three transmissions of TSN UE 1 (transmissions 1 to 3) are pre-emptable as either of these can be rescheduled within symbols 6 and 7 of the next slot which is still within the air-interface window. The budget includes the two symbols of the transmission and the acknowledgement (ACK) needed at the end of any rescheduled transmission. The fourth transmission of TSN UE 1 (transmission 4) is not pre-emptable because the air-interface window ends before the primary control channel in the next slot, hence there is no opportunity for re-transmission of the fourth transmission before the end of the air-interface window.

Although transmissions 1 to 3 of TSN UE 1 are pre-emptable, only one transmission can be pre-empted based on the available latency budget.

FIG. 25 also illustrates the multi-domain one-shot allocation procedure. Resource allocation in time and frequency domains is performed through a 3-dimensional (3D) allocation matrix. The first dimension of the matrix is the symbols in time domain, the second dimension of the matrix is the REGs in frequency domain and the third dimension of the matrix is the available BWPs. For example, the allocation matrix for one BWP comprising 3 REG (numbered 1 to 3), and 9 symbols (numbered 0 to 8) is shown below. Each element of the allocation matrix indicates its status for allocation. For example, a '0' indicates that the symbol/REG is available for allocation whereas a '1' indicates otherwise. Certain symbols and REGs are reserved for control as indicated by $\infty$.

$$A(:,:,1) = \begin{bmatrix} \infty & 1 & 1 & 0 & 1 & 0 & 1 & 1 & 1 \\ \infty & 1 & 1 & 0 & 1 & 0 & 0 & 1 & 1 \\ \infty & 1 & 0 & 0 & 0 & 0 & 0 & 0 & 0 \end{bmatrix}$$

If it is the first allocation (S2507), then an allocation matrix is initialised (S508). If it is not the first allocation, then an existing allocation matrix is used (S509). The base station finds the earliest available symbols/REGs for allocation to an air-interface window (S5210). This minimizes the scheduled length of an air-interface which leads to minimizing the cumulative scheduled length of all air-interface windows. For example, if a transmission requires 1 symbol and 1 REG, then it would be allocated REG 3 on symbol 2 (assuming symbol 0 for control). Similarly, if a transmission requires 2 symbols and 2 REGs, then it would be allocated REGs 2 and 3 on symbols 5 and 6. The base station performs allocation on the second BWP if enough resources are not available on the first BWP.

If all alternate BWPs are not available, the base station triggers pre-emptive transmissions (S2511) which is explained later.

The base station then schedules transmission of the TSN UE in S5212 and updates the allocation matrix in S2513). The transmissions for the frame are transmitted over the air-interface (S2515).

If pre-emptive transmissions are triggered, then based on the pre-emption mapping, the base station appropriates transmissions based on maximum latency budget (S2516). The base station schedules transmissions on pre-empted resources (S2517). For the pre-empted UEs, the base station assigns new resources for the pre-empted TSN UEs (S2518) and transmits new resource assignment information on the next primary control channel (S2519). Due to the dynamic scheduling of secondary control channels, they are not used for communicating the punctured resources to the pre-empted UEs.

Multi-Domain Scheduling of Critical and Best-Effort TSN Traffic

In some embodiments, critical as well as best-effort TSN traffic for multiple TSN domains can be scheduled. In some cases, the air-interface window is shared between critical and best-effort traffic. This implies that one critical TSN frame and one or more best-effort TSN frames need to be transmitted within the air-interface window. This is compatible with the cyclic queuing and forwarding (CQF) model of TSN. In other cases, there are separate air-interface windows for critical and best-effort traffic due to separate timeslots for both types of traffic in the TSN cycle.

FIG. 27 shows the multi-domain scheduling of critical and best-effort TSN traffic within a single air-interface window. Two slots on the air-interface are considered such that each slot consists of 14 symbols (numbered 0 to 13). A single BWP comprising 6 REGs (numbered 1 to 6 from bottom) in each symbol is assumed. It is assumed that a single TSN frame needs to be transmitted in the air-interface windows of TSN domains 1 and 2 for each of control and best-effort traffic. Further, it is assumed that the TSN UE 1 requires 4 transmissions for its control frame and 2 transmissions for its best-effort frame such that each transmission requires 2 symbols in time domain. It is assumed that the TSN UE 2 requires 3 transmissions each for its control and best-effort traffic such that each transmission requires 1 symbol in time domain. In this case, opportunistic scheduling for best-effort traffic is performed while prioritizing control traffic as per the multi-domain scheduling strategy.

TSN UE 1 gets scheduled in the primary control channel on the first slot. Based on the scheduling algorithm, its 4 transmissions for control traffic are scheduled on the earliest available symbols (in order to minimize the length of the scheduling window), such that transmission 1 on symbols 2 and 3, transmission 2 on symbols 6 and 7, transmission 3 on symbols 10 and 11, in the first slot and transmission 4 on symbols 1 and 2 in the second slot. In frequency domain each transmission gets REGs 1-3 on each symbol. The two transmissions for best-effort traffic of TSN domain 1 are scheduled opportunistically on symbols 6 and 7 and symbols 10 and 11 in the first slot. In the frequency domain, each transmission gets REGs 4-6 in each symbol.

TSN UE 2 gets scheduled in the second secondary control channel on the first slot. Its 3 transmissions for control traffic are scheduled on the earliest available symbols, i.e., symbols 12 and 13 in the first slot and symbol 3 in the second slot. Each transmission is scheduled on REGs 1-3 in the frequency domain. The two transmissions for its best-effort traffic are scheduled opportunistically (whenever there is an available scheduling opportunity) in available symbols, i.e., symbol 13 on the first slot and symbols 3 and 5 in the second slot. Two transmissions are scheduled on REGs 4-6 in the frequency domain. The third transmission is scheduled on REGs 1-3. Since both air-interface windows end around a similar time, the base station schedules a single symbol for receiving ACKs in the time domain.

FIG. 28 illustrates the multi-domain scheduling of critical and best-effort TSN traffic with separate air-interface windows. A single TSN domain with separate air-interface windows for control and best-effort traffic is considered. Three slots on the air-interface are considered such that each slot consists of 14 symbols (numbered 0 to 13). One solution is to perform resource allocation individually for each air-interface window. However, this may not be attractive due to relatively higher scheduling overheads.

In an embodiment, a proactive scheduling approach for best-effort traffic is implemented while prioritizing control traffic. Such proactive allocation is possible as a timeslot for control traffic is always followed by a timeslot for best-effort traffic in the TSN cycle. Therefore, an air-interface window for control is followed by an air-interface window for best-effort traffic. However, there can be variable delay between the two air-interface windows. The TSN UE gets scheduled for both control and best-effort windows via the primary control channel on the first slot. The air-interface window for control is scheduled in a similar way as described earlier. The 4 transmissions are scheduled in the earliest available resources on BWP 1. The base station also allocates resources for transmission of ACK.

To perform proactive resource allocation, the base station estimates an interval during which the best-effort window is expected to arrive at the air-interface. Such estimation is described later under "Dynamic scheduling of secondary control channels". Moreover, the base station computes the size of transport block for the TSN UE based on which it estimates the number of segments required for transporting a TSN frame. Unlike control traffic, the number of best-effort TSN frames to be transported in an air-interface window can be variable. The base station reserves some frequency domain resources for the best-effort traffic on a separate BWP (i.e., BWP 2). However, such reservation is 'soft' in nature as these resources can be shared with other best-effort air-interface windows or pre-empted if no resources are available for critical control traffic. FIG. 28 shows allocated resources for best-effort traffic in the second and third slots. The base station also schedules resources for ACK toward the end of the air-interface window.

FIG. 29 illustrates the algorithm for proactive scheduling of best-effort traffic.

In S2901, the air-interface for control begins. The bases station computes the number of required transmissions for the control traffic in S2902. This includes any segmentation of the frame or repeat transmissions required, as detailed previously.

In S2903, the base station then schedules transmissions for air interface window of control traffic on a first BWP (BWP1) based on the multi-domain TSN scheduling method outlined in FIG. 25. The transmission are scheduled through either the primary control or secondary control channel dependent on whether $T_a+T_{proc}<T_{tx,p}$ or $T_a+T_{proc}>T_{tx,p}$, as detailed previously.

In S2904, the bases station estimates the arrival time of the air-interface window for the best-effort traffic. In S2905, the base station computes the number of segments for one frame of best-effort traffic. In S2906, the base station reserves resources for best-effort air-interface window on a second BWP (BWP2). As detailed above, this reservation is 'soft' in nature. The transmissions for the frames of best-effort traffic and control traffic are transmitted over the air-interface (S2907).

Dynamic Scheduling of Secondary Control Channels

In order to reduce scheduling latency of TSN traffic, multiple secondary control channels per slot are desirable. One solution is a fixed number of secondary control channels per slot. In this case, the UE would be configured by the RRC layer with a fixed monitoring frequency. However, such a solution incurs significantly high energy consumption for the UE. In an embodiment, dynamic scheduling of secondary control channels is implemented. Such dynamic scheduling allocates secondary control channels as per TSN traffic requirements.

FIG. 30 illustrates the dynamic scheduling procedure. Let $T_{cycle}$ denote the duration of the TSN cycle. It is assumed that the base station has information about the minimum and the maximum backhaul latency, which is denoted by $T_{min}$ and $T_{max}$, respectively. Let $T_a^1$ denote the arrival time of the first air-interface window of a TSN domain at the air-interface. The arrival time of the second air-interface window of the same TSN domain is given by $$T_a^2=T_a^1+(T_{cycle}-X)Y; \text{such that } [X,Y]\in[T_{min},T_{max}].$$

The base station calculates an arrival window during which the next air-interface window is expected to arrive at the air-interface. The start and finish times of this window are denoted by $W_a^s$ and $W_a^r$, respectively, and given as follows.

$$W_a^s=T_a^1(T_{cycle}-T_{max})+T_{min}$$

$$W_a^f=T_a^1+(T_{cycle}-T_{max})+T_{max}$$

The TSN UE gets scheduled for the first air-interface window in a slot which is referred to as the anchor slot. The arrival window for the next air-interface window may fall within a single slot or span multiple slots. The base station maps the arrival window to reference slots on the air-interface, i.e., the arrival window falls in a reference slot (Ref_slot) or it spans multiple reference slots [Ref_slot1, Ref_slot2]. The base station schedules more secondary control channels within and around reference slots in order to minimize scheduling latency for the next air-interface window. It schedules more secondary control channels around the reference slots in order to cater for traffic variations. In FIG. 30, three secondary control channels are scheduled in the reference slots whereas two secondary control channels are scheduled in slots preceding and following the reference slots. The TSN UE gets scheduled for the first air-interface window in the anchor slot via the primary or the secondary control channels. In addition to resource allocation for the first air-interface window, the TSN UE obtains information about the reference slots (Ref_slot, or Ref_slot1 and Ref_slot2). The TSN UE must monitor the primary control channel in the slot before the reference slot, i.e., slot (Ref_slot1−1). This is where the base station advertises the number of secondary control channels in the subsequent slots. The TSN UE starts monitoring the secondary control channels to obtain resource allocation for the next air-interface window. Upon allocation, the TSN UE skips the remaining secondary control channels. Note that the TSN UE does not need to monitor the primary or secondary control channels in the slots following the anchor slot until slot Ref_slot1−1.

FIG. 31 and FIG. 32 illustrate dynamic scheduling of secondary control channels according to an embodiment. Initially, the base station schedules a fixed number of secondary control channels per slot (S3101). The TSN UE is configured by the RRC layer with a fixed monitoring frequency (S3201). Each TSN UE monitors primary and secondary control channels in each slot (S3102, S3201).

Upon allocation for the first air-interface window of a TSN domain (S3103), the base station estimates the arrival window and reference slots (Ref_slot, or Ref_slot1 and Ref_slot2) for the next air-interface window (S3104). In S3105 the base station schedules more secondary control channels within and around the reference slots (Ref_slot, or Ref_slot1 and Ref_slot2). The base station schedules the TSN UE in the anchor slot (S3106, S3202). The base station transmits information about the references slots in the anchor slot (S3107). The TSN UE skips monitoring of control channels until slot Ref_slot1−1 (S3203). The TSN UE obtains new information about secondary control channels from the primary control channel in slot Ref_slot1−1 (S3204). The TSN UE the monitors primary and secondary control channels until it obtains allocation (S3205). This procedure is repeated for all TSN domains to optimize secondary control channels as per the respective traffic variations (S3108).

In some embodiments, the base station reserves some resources for the transmissions of the next air-interface window in the reference slots. However, this is a soft reservation and these resources can be allocated to other TSN domains. The transmissions are transmitted over the air-interface.

Design of Control Channels

FIG. 33 illustrates an embodiment wherein secondary control channels for different TSN domains are defined in different BWPs. These control channels can be used for domain-specific resource allocation and ACKs. The base station simultaneously handles grants and ACKs for multiple TSN domains. Defining control channels within specific BWPs reduces monitoring overheads on the TSN UE side which leads to improvement in energy efficiency. Moreover, this provides flexible operation for UE-side ingress as control channels can be shared between ACKs and scheduling requests. UE-side ingress creates additional demand for control channels. Hence, these secondary control channels defined within specific BWPs can be shared for different control-plane tasks (grants, requests, ACKs).

Uplink Scenario

The multi-domain TSN scheduling strategy can seamlessly operate for uplink scheduling, i.e., UE-side TSN traffic ingress. Conventional grant-free uplink resource allocation techniques assuming periodic traffic arrival in this case are likely to experience performance degradation in terms of resource utilization and reliability. This is because of traffic arrival variations owing to processing overheads at the multi-interface (TSN+5G) UE. Moreover, such grant-free allocation techniques typically rely on overlapping grants for multiple UEs. This is likely to result in collisions during data transmission phase, especially if the base station configures the TSN UE with bundled transmissions.

FIG. 34 illustrates how the base station, of an embodiment, performs a paired scheduling of secondary control channels for both scheduling requests and scheduling grants in order to handle UE-side TSN traffic ingress. Paired scheduling is used because the uplink is not relying on typical grant-free access techniques. The first secondary control channel is for uplink and does not define a mini-slot. The second secondary control channel is for downlink and defines a mini-slot. The secondary control channel for downlink can be shared as the UE must receive grant from the base station after which the base station must acknowledge data transmissions from the UE Such paired scheduling of secondary control channels for requests and grants can be dynamically adjusted as described previously (i.e., dynamic scheduling of secondary control channels). Moreover, the time domain resources for scheduling requests can be shared in frequency domain with ACKs.

Time-Triggered MAC Operation

Conventional approach of resource allocation by the base station in 5G networks is based on the MAC layer triggering the RLC layer for sending data. The MAC layer computes the size of a transport block based on the number of resource blocks assigned to a UE. In an embodiment, a new approach of time-triggered MAC operation is provided wherein the MAC layer is triggered by the higher layer to transmit data according to a time-driven schedule. One way to achieve such time-triggered MAC operation is to use TSN as a backhaul between the RAN and the core network (i.e., between the base station and the UPF). Using TSN as a backhaul provides deterministic latency. However, this backhaul TSN system is not operating as part of the external multi-domain TSN system. Therefore, it can be customized for time-triggered MAC operation in the RAN.

FIG. 35 and FIG. 36 describe the time-triggered MAC operation. FIG. 35 shows the system model with TSN as a backhaul between the RAN and the core network. The 5G system is shared with multiple TSN domains. In an embodiment, the TSN backhaul is not operating in conjunction with the external multiple TSN domains. Assuming UPF-side ingress, multiple TSN cycles of fixed or variable durations are arriving at the 5G network. The TSN backhaul system implements a time-aware traffic shaping strategy wherein control and best-effort traffic of different TSN domains is sent in fixed timeslots to the RAN. Hence, the RAN (base station) knows the arrival time of TSN traffic as it is scheduled. Based on this, the RAN implements time-triggered operation. The MAC layer gets triggered by higher layers based on the TSN schedule. The time-triggered operation schedules control and best-effort TSN traffic in uniformly distributed mini-slots on the air-interface.

The duration of these mini-slots is customized as per the time-aware traffic shaping strategy implemented by the backhaul TSN system.

FIG. 36 illustrates one scenario for the case of two TSN domains where transmissions for control and best-effort traffic take place over uniformly distributed mini-slots spread across two slots. The transmissions are spread across two BWPs which are shared between control and best-effort traffic. Each slot also contains some resources for ACKs from the TSN UEs.

The primary control channel at the beginning of each slot carries information regarding which TSN UEs would be scheduled in that slot. Based on the TSN traffic periodicity and fixed backhaul latency, allocated resources can be reserved for future transmissions. Hence, TSN UEs monitor slots at fixed intervals for receiving data transmission from the base station. Such time-triggered MAC operation provides a minimal latency transmission strategy for transmission of TSN traffic over the RAN while meeting the end-to-end requirements. It also provides optimized utilization of radio resources while reducing monitoring overheads and energy consumption of TSN UEs. Moreover, it provides native support for using TSN as a backhaul within the 5G system.

The described methods and systems provide novel packet scheduling enhancements for integrated 5G and multi-domain TSN systems. The disclosed packet scheduling framework provides an effective solution for handling multi-domain TSN traffic over the 5G air-interface while meeting end-to-end performance requirements of integrated 5G and TSN deployments. The described methods and systems adopt a hybrid scheduling approach that integrates the benefits of both dynamic and semi-persistent scheduling techniques. They implement a window-based allocation strategy that provides native support for handling single-domain or multi-domain TSN traffic under traffic variations. They exploit some of the key capabilities of a 5G-NR system for optimized scheduling of TSN traffic with very low latency. They also implement dynamic scheduling of control channels that reduces energy consumption on user equipment (UE)-side.

The distinguishing aspects of the described methods and systems are as follows:

Window-based Scheduling: The described methods and systems implement a window-based scheduling strategy that allocates radio resources to an air-interface window pertaining to a TSN cycle. Such window-based scheduling ensures delivery of critical TSN traffic within end-to-end latency constraints on the 5G system.

Multi-domain TSN Scheduling: Owing to window-based scheduling, the described methods and systems provide native support for simultaneously handling multiple TSN domains over a 5G system. Further, they provide optimizations for multi-domain TSN scheduling.

Hybrid Scheduling: The described methods and systems implement a hybrid scheduling approach that integrates the features of both dynamic scheduling and semi-persistent scheduling. Resource allocation for different air-interface windows is handled in a dynamic manner. However, resource allocation for multiple transmissions pertaining to an air-interface window is handled on a fixed basis. Unlike semi-persistent techniques, the described methods and systems implement a soft reservation strategy, in some embodiments, that maximizes resource utilization under arrival time variations at the RAN.

Heterogeneous Transmissions: The described methods and systems exploit some of the key capabilities of 5G-NR system for optimized scheduling of TSN traffic. They implement slot-based scheduling (unlike conventional subframe-based scheduling) that integrates slot-based transmissions (SBTs), non-slot-based transmissions (NSBTs) and pre-emptive transmissions (PTs).

Dynamic Scheduling of Control Channels: The described methods and systems implement dynamic scheduling of control channels as per TSN traffic variations. Conventional techniques rely on fixed number of control channels on the air-interface. Such dynamic scheduling of control channels reduces energy consumption on UE-side.

Time-triggered MAC Operation: In some embodiments, the described methods and systems operate the RAN in a way that the MAC layer receives time-triggered transmissions which can be uniformly scheduled across one or more slots. Such time-triggered operation provides optimized allocation in terms of latency, energy consumption and resource utilization. Moreover, it provides native support for TSN operation within a 5G system (e.g., TSN as a backhaul).

Some of the key advantages of the described methods and systems are as follows.

They enable the 5G-RAN to adapt to any traffic variations and/or traffic uncertainties without compromising end-to-end performance in integrated 5G and TSN systems.

They provide an equally effective solution to cater for periodic traffic without any modifications.

They facilitate integration of TSN within a 5G, e.g., as a backhaul between the RAN and the core network. It provides transparent operation with TAS in case of TSN backhaul.

They provide a single solution for scheduling TSN traffic with UE-side ingress (i.e., in the uplink) or UPF-side ingress (i.e., in the downlink). This provides seamless operation in mixed deployments with TSN domains both UE-side ingress and UPF-side ingress.

They provide various enhancements that reduce monitoring overhead of control channels that provides energy-efficient operation.

They provide robust, low-latency, adaptive, and scalable scheduling technique which can be extended to a range of (non-TSN) critical applications supported by private 5G systems.

While certain arrangements have been described, the arrangements have been presented by way of example only, and are not intended to limit the scope of protection. The inventive concepts described herein may be implemented in a variety of other forms. In addition, various omissions, substitutions and changes to the specific implementations described herein may be made without departing from the scope of protection defined in the following claims.

The invention claimed is:

1. A method, comprising:
when a first air-interface window associated with a first entity in a time-sensitive network including at least one time-sensitive network entity begins before a primary control channel in a first slot of a plurality of slots, scheduling, by a base station via the primary control channel, a frame from the first entity for data transmission over data channels of an air-interface in a composite network, wherein the composite network includes the time-sensitive network and a wireless network including at least one base station using the air-interface, wherein a wireless transmission over the air-interface is scheduled and transmitted, wherein the air-interface includes the plurality of slots, wherein each slot of the plurality of slots has the primary control channel defined at the beginning of the slot, and a number of secondary control channels defined in each slot after the primary control channel, and a plurality of data channels, each primary control channel defining a slot, each secondary channel defining a mini-slot, the mini-slot being included in the slot defined by the primary control channel, the base station being capable of scheduling the frame via the primary control channel as well as the secondary control channel; and
when the first air-interface window associated with the first entity in the time-sensitive network begins after the primary control channel in the first slot but before a secondary control channel in the first slot, scheduling, by the base station via the secondary control channel, the frame from the first entity for data transmission over data channels of the air-interface, the primary control channel in the first slot starting before the secondary control channel in the first slot.

2. The method according to claim 1, wherein the frame from the first entity includes a plurality of transmissions, wherein each transmission is scheduled over a corresponding data channel in the air-interface.

3. The method according to claim 1, wherein each data channel includes at least one symbol in a time domain and a number of resource elements in a frequency domain, and
the method further includes scheduling, by the base station, the frame from the first entity for transmission over data channels of the air-interface using an allocation matrix, wherein the allocation matrix indicates an availability of the resource elements of the air-interface.

4. The method according to claim 3, wherein the frame from the first entity is scheduled for transmission on a first set of the resource elements, and
the method further includes scheduling, by the base station, a frame from a second entity associated with a second air-interface window for transmission over data channels of the air-interface using the allocation matrix, wherein the frame from the second entity is scheduled on a second set of the resource elements.

5. The method according to claim 3, further comprising determining, by the base station, using the allocation matrix, earliest available resource elements, of the resource elements, for allocation to the first air-interface window associated with the first entity.

6. The method according to claim 1, further comprising:
when the frame from the first entity includes a critical control, and there are no available data channels for transmission of the frame;
overwriting, by the base station, scheduled transmissions for a third entity; and
rescheduling, by the base station, the overwritten scheduled transmissions for the third entity in a primary control channel of a second slot.

7. The method according to claim 1, wherein the number and a location of the secondary control channels is selected dynamically.

8. The method according to claim 1, wherein the secondary control channels for the first entity are defined in a first bandwidth part (BWP), and secondary control channels for a fourth entity are defined in a second BWP (bandwidth part).

9. The method according to claim 1, wherein the frame includes a critical frame and a best-effort frame, wherein the critical frame and the best-effort frame need to be transmitted during the first air-interface window.

10. The method according to claim 1, wherein the base station is connected to a core network of the wireless network via a backhaul guided network, and
the method further includes
sending, by the backhaul guided network, data from the plurality of time-sensitive networks to the base station at fixed intervals; and
scheduling, by the base station, control and best-effort frames in uniformly distributed data-channels of the air-interface.

11. The method according to claim 1, wherein each secondary control channel defining the mini slot is preceded by another secondary control channel not defining a mini slot, wherein the another secondary control channel not defining the mini slot is for uplink data, and the secondary control channel defining a mini slot is for downlink data.

12. A system, comprising:
a time-sensitive network including at least one time-sensitive network entity, a wireless transmission over an air-interface being scheduled and transmitted; and
a wireless network including at least one base station and the air-interface,
wherein the air-interface includes a plurality of slots, wherein each slot has a primary control channel defined at a beginning of the slot, and a number of secondary control channels defined in each slot after the primary control channel, and a plurality of data channels, each primary control channel defining a slot, each secondary channel defining a mini-slot, the system configured to:
when an first air-interface window associated with a first entity in the time-sensitive network arrives at the air-interface before a primary control channel in a first slot of the plurality of slots, scheduling, by the base station via the primary control channel, a frame from the first entity for data transmission over data channels of the air-interface; and
when the first air-interface window associated with the first entity in the time-sensitive network arrives at the air-interface after the primary control channel in the first slot but before a secondary control channel in the first slot, scheduling, by the base station via the secondary control channel, the frame from the first entity for data transmission over data channels of the air-interface.

* * * * *